(12) United States Patent
Yamawaki

(10) Patent No.: US 7,059,094 B2
(45) Date of Patent: Jun. 13, 2006

(54) FRAME STRUCTURE

(75) Inventor: Koji Yamawaki, Tsukuba (JP)

(73) Assignee: Japan Aerospace Exploration Agency, Tokyo (JP)

( * ) Notice: Subject to any disclaimer, the term of this patent is extended or adjusted under 35 U.S.C. 154(b) by 422 days.

(21) Appl. No.: 10/354,974

(22) Filed: Jan. 31, 2003

(65) Prior Publication Data

US 2003/0145552 A1 Aug. 7, 2003

(30) Foreign Application Priority Data

Feb. 1, 2002 (JP) ........................... 2002-025679

(51) Int. Cl.
*E04H 12/18* (2006.01)

(52) U.S. Cl. .................. 52/646; 52/653.1; 52/655.1; 52/648.1; 135/143; 135/144; 135/147; 135/128

(58) Field of Classification Search ............... 52/653.1, 52/655.1, 64, 646, 641, 648.1; 135/143, 144, 135/145, 147, 128
See application file for complete search history.

(56) References Cited

U.S. PATENT DOCUMENTS

| | | | | |
|---|---|---|---|---|
| 1,853,367 | A | * 4/1932 | Mace ........................ | 135/145 |
| 2,530,765 | A | * 11/1950 | Greenup .................... | 135/147 |
| 3,838,703 | A | 10/1974 | Zeigler | |
| 4,473,986 | A | * 10/1984 | Zeigler ..................... | 52/653.1 |
| 4,555,585 | A | 11/1985 | Behrens et al. | |
| 4,578,920 | A | * 4/1986 | Bush et al. ................ | 52/655.1 |
| 4,689,932 | A | * 9/1987 | Zeigler ..................... | 52/653.1 |
| 5,243,803 | A | 9/1993 | Tabata et al. | |
| 5,505,035 | A | * 4/1996 | Lalvani .................... | 52/648.1 |
| 5,992,120 | A | * 11/1999 | Meguro et al. ........... | 52/653.1 |

FOREIGN PATENT DOCUMENTS

| | | |
|---|---|---|
| GB | 25 093 894 | 9/1982 |
| JP | 59-194310 | 11/1984 |
| JP | 62-015904 | 1/1987 |
| JP | 62-029206 | 2/1987 |
| JP | 01-122800 | 5/1989 |
| JP | 01278638 A * | 11/1989 |
| JP | 01-278638 | 11/1989 |
| JP | 04-129404 | 4/1992 |
| JP | 04-132402 | 5/1992 |
| JP | 04-160802 | 6/1992 |

OTHER PUBLICATIONS

Patent Abstracts of Japan Publ. No. 62–029206, Feb. 7, 1987.

(Continued)

*Primary Examiner*—Anthony D. Barfield
(74) *Attorney, Agent, or Firm*—Jacobson Holman PLLC

(57) ABSTRACT

A frame structure has a structural unit containing six elongated posts, each post having first and second ends, the structural unit capable of having at least an unfolded state where the six posts are substantially contained in one plane and a folded state where the six posts extend substantially parallel to each other. The frame structure has post-midpoint joints formed in each of the posts for supporting the posts of the structural unit foldably at approximate midpoints of the posts; a central joint for supporting the posts of the structural unit at the first ends of each of the posts rotatably in a plane perpendicular to the plane of the unfolded state. The six posts of the structural unit are positioned in the unfolded state such that the posts extend radially from the central joint within substantially one plane, so that a line connecting the second ends of the six posts of the structural unit forms substantially an equilateral hexagon. In addition, the six posts of the structural unit are bound at the first end by way of the central joint in the folded state, and being foldable such that the six posts extend parallel to each other by way of the central joint. The structure does not require a special accessory technique or facility to construct the structure even when a space structure to be constructed becomes larger.

8 Claims, 30 Drawing Sheets

OTHER PUBLICATIONS

Patent Abstracts of Japan Publ. No. 01–122800, May 16, 1989.
Patent Abstracts of Japan Publ. No. 04–129404, Apr. 30, 1992.
Patent Abstracts of Japan Publ. No. 04–132402, May 6, 1992.
Patent Abstracts of Japan Publ. No. 62–015904, Jan. 24, 1987.
Patent Abstracts of Japan Publ. No. JP 04–160802, Jun. 4, 1992.
Patent Abstracts of Japan Publ. No. JP 01–278636, Nov. 9, 1989.

* cited by examiner

FRAME STRUCTURE

BACKGROUND OF THE INVENTION

1. Field of the Invention

The present invention relates to a frame structure which is containable by folding it into a compact shape, and more particularly to such frame structure which can be easily transported through aerospace and unfolded at a place desired so that it forms a plane or a three-dimensional structure having high degree of freedom.

2. Description of Prior Art

In a construction of large aerospace structure, construction works on the orbit has been increased and complicated as the structure has become larger, and thus facilities such as a construction robot on the orbit and works done by astronauts outside the spaceship are inevitable.

There is a technique for constructing large aerospace structure called "inflatable." In this technique, first of all, a membrane structure is inflated by gas, and then the structure is solidified chemically and/or physically to form a structure. It seems that this structure is easily constructed and is extremely light-weight. However, it is difficult to control the shape of the structure being formed precisely. Therefore, applications of the technique are limited. In addition, the technique has a shortcoming that the structure is not highly recyclable.

In the case of solar batteries mounted on a satellite, many of such batteries employ an oblong plate which is folded when it is contained and expanded to a long plate on the orbit. These prior art structures have advantages that they are easily contained and their extension mechanisms are simple. However, on the other hand, they have problems that their ways of extension are limited in one-dimension, and they lack applicability and adoptability to larger structures.

Furthermore, when large space structures such as space stations are constructed in aerospace, it is desired to use all-purpose structural members which can be assembled by simple work, and it is required to transport such members efficiently. For example, a panel for a solar battery and antenna are usually folded into compact shapes and contained when they are transported, and unfolded on the orbit. However, the techniques provided so far do not always satisfy these requirements.

SUMMARY OF THE INVENTION

Accordingly, it is an object of the present invention to solve the problems just described. The present invention provides a structure which does not require a special accessory technique or facility to construct the structure even when a space structure to be constructed becomes larger.

In addition, it is an object of the present invention to provide an inflatable structure which can be unfolded easily and precisely into a form desired.

Furthermore, it is an object of the present invention to provide a structure which can have not only two-dimensional structure but also three-dimensional structure by connecting, folding and unfolding the structure having characteristic constitution.

The objects just described are achievable by a frame structure having a structural unit containing six elongated posts, each post having first and second ends, the structural unit capable of having at least an unfolded state where the six posts are substantially contained in one plane and a folded state where the six posts extend substantially parallel to each other, the frame structure having post-midpoint joints formed in each of the posts for supporting the posts of the structural unit foldably at approximate midpoints of the posts; a central joint for supporting the posts of the structural unit at the first ends of each of the posts rotatably in a plane perpendicular to the plane of the unfolded state; the six posts of the structural unit being positioned in the unfolded state such that the posts extend radially from the central joint within substantially one plane, so that a line connecting the second ends of the six posts of the structural unit forms substantially an equilateral hexagon; and the six posts of the structural unit being bound at the first end by way of the central joint in the folded state, and being foldable such that the six posts extend parallel to each other by way of the central joint.

In this connection, it is preferred that each of the posts of the structural unit has a flexed state satisfying:

$$\beta = 2 \times (90° - \alpha)$$

where $\alpha$ is a connection angle between the post of the structural unit and the central joint at the first end, and $\beta$ is a flexion angle of the post in its flexed state at the post-midpoint joint between the unfolded state and the folded state, and the frame structure further has elongated connecting posts being disposed in their flexed states such that they connect the second ends of adjoining posts of the structural unit to each other; and tip joints for connecting the second end of the post of the structural unit to a pair of ends of the connecting posts locating at both sides of the second end.

It is further preferred that the frame structure further has a first membrane member spread in a plane formed by adjoining first post parts which are the parts of the posts of the structural unit from the central joint to the post-midpoint joints; a second membrane member spread in a plane formed by adjoining second post parts which are the parts of the posts of the structural unit from the post-midpoint joints to the second ends; and the first and the second membrane members, in the unfolded state, form a membranous structure of equilateral hexagon whose center is the central joint in one plane, and in the folded state, they are contained by cooperating with the posts and the connecting posts of the structural unit.

Furthermore, the frame structure may further have a plurality of the structural unit, and the frame structure may further have unit-connecting joints for rotatably supporting each second end of the posts of adjoining structural units and each one end of a pair of the connecting posts, or each second end of the posts of three neighboring structural units and each one end of three connecting posts accompanying with the structural units; and the unit-connecting joints connecting a plurality of the structural unit.

The frame structure may further have a connecting member for connecting the tip joints and the central joint; and angle adjusting means for adjusting a flexion angle of the structural unit and the connecting post to a predetermined angle by controlling the connecting member to adjust a distance between the tip joint and the central joint.

In this connection, the distance between the tip joint and the central joint may be adjusted within one plane.

The frame structure may yet further have a connecting member for connecting the tip joints and the unit-connecting joint; and means for adjusting a connection angle or a flexion angle of the structural unit and the connecting post to a predetermined angle by controlling the connecting member to adjust a distance between the tip joint and the unit-connecting joint.

In this connection, the distance between the tip joint and the unit-connecting joint may be adjusted within one plane.

Meanwhile, the tip joint, the central joint and the unit-connecting joint may have the same specification. Namely, if a joint which enables an angle of the receiving part for containing the end of the post of the tip joint or the central joint to be adjusted is provided, such joint can be used as a central joint or a tip joint by adjusting the angle to 180°.

DESCRIPTION OF THE PREFERRED EMBODIMENT

Figure 1:
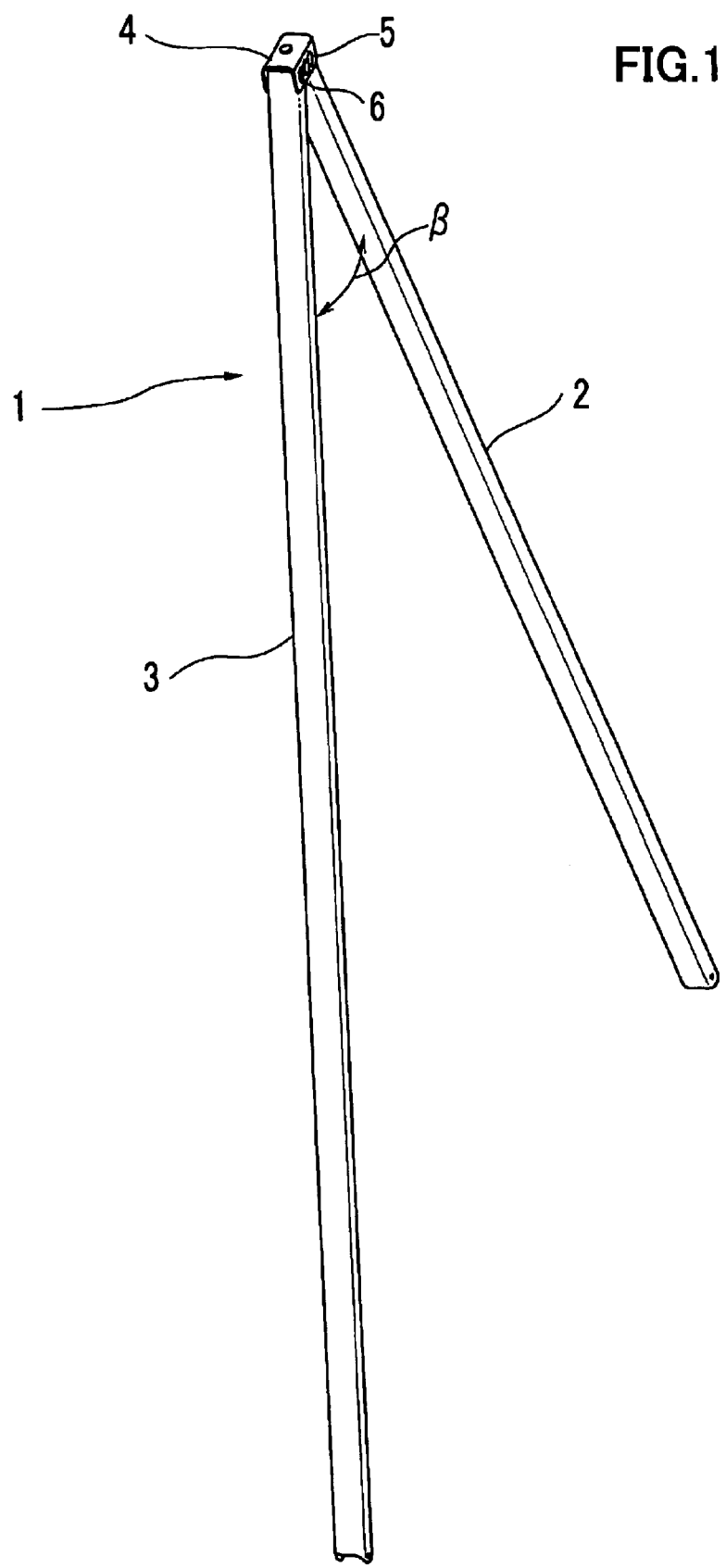
FIG. 1 is a perspective view of the post constituting the frame structure of the present invention.

With referring to the drawings, embodiments of the present invention will be explained hereinafter. Referring to FIG. 1, an embodiment of post 1 used for the frame structure of the present invention is shown. The post 1 of this embodiment has two post parts having channel-shape cross section, first post part 2 and second post part 3, which have the same length and structure. The first end of each of these two post parts 2, 3 are connected rotatably by post-midpoint joint 4. The post-midpoint joint 4 consists of a member having a channel shape, and extends such that it is perpendicular to post parts 2, 3 in the folded state of the post where post parts 2, 3 extend parallel. On the other hand, post-midpoint joint 4 extends along the direction to which post parts 2, 3 extend in the unfolded state where post parts 2, 3 as if they were one post 1. In addition, rotation axes 5, 6 are provided to support each of post parts 2, 3. The both ends of axes 5, 6 are supported by flange parts of post-midpoint joint 4.

Figure 2:
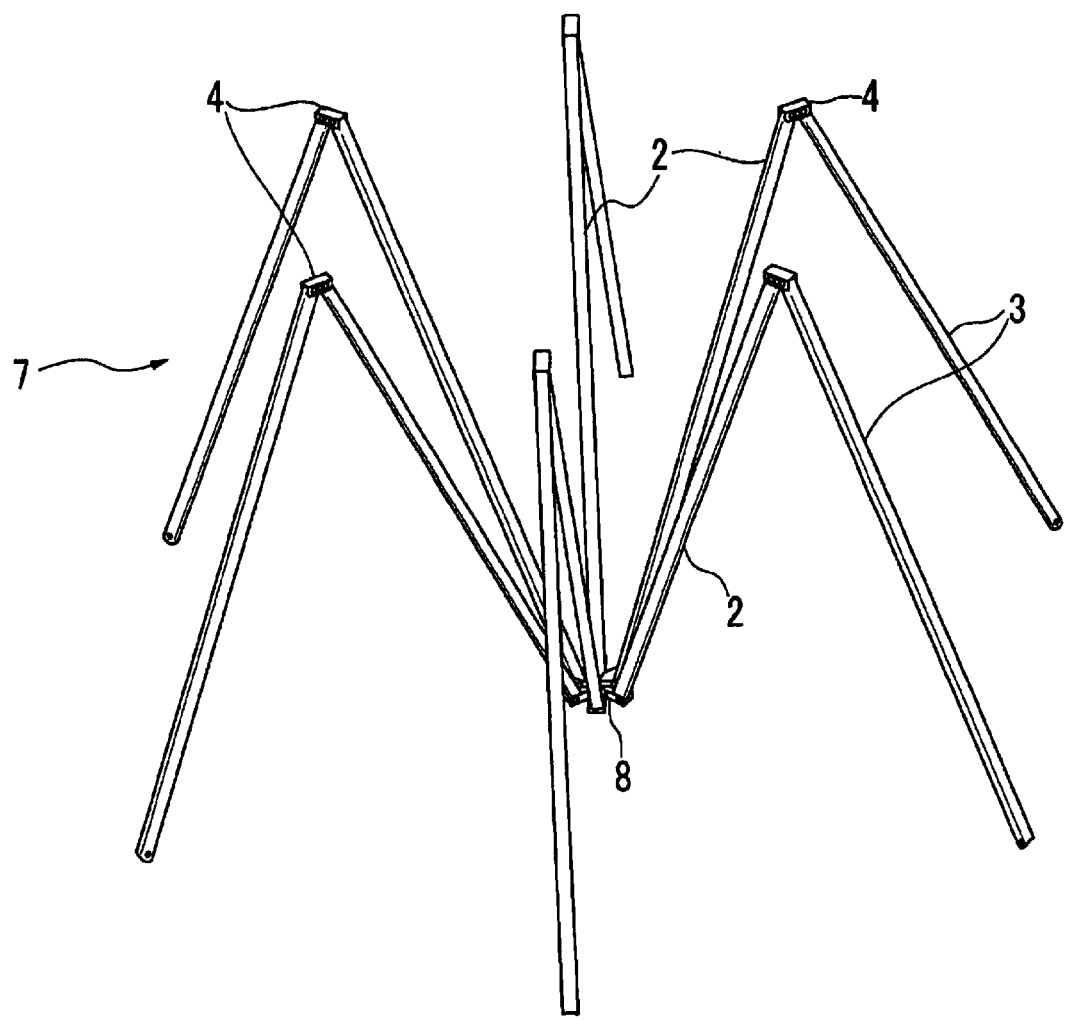
FIG. 2 is a perspective view of the structural unit having six-pieces combination.
Figure 3:
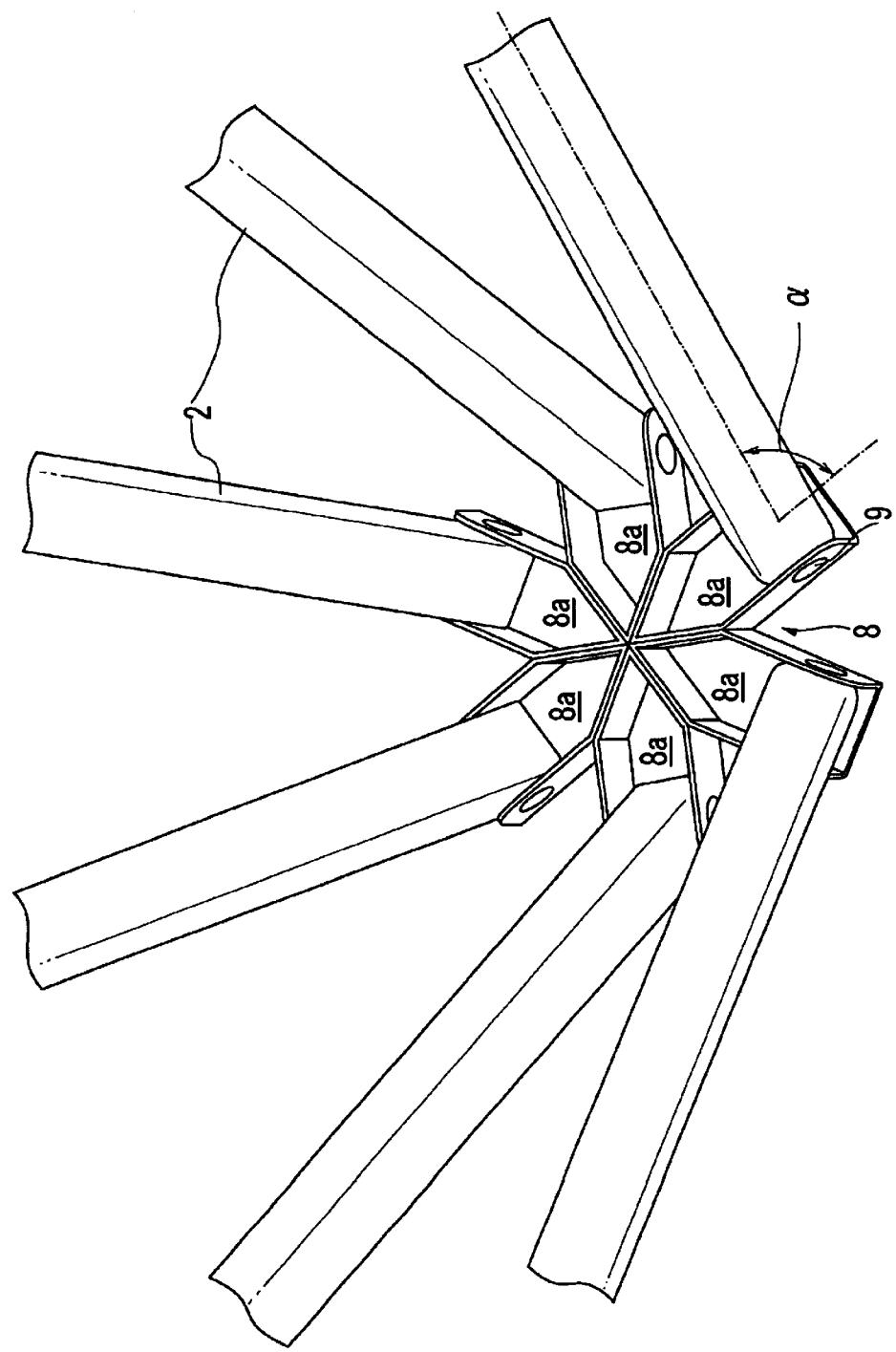
FIG. 3 is a perspective view showing the central joint in use.

Referring to FIGS. 2 and 3, six-pieces structural unit 7 constituting of six posts 1 according to the present invention is shown. The structural unit 7 has a structure such that six posts 1 are disposed in the circumference direction with the same angle, namely every 60°. Disposed at the center part of the structural unit is central joint 8. As shown in FIG. 3, the first end of each of six posts 1 is supported rotatably by the central joint 8. As shown in FIG. 3 in detail, central joint 8 has receiving part 8a which is a channel part extending radially from the center in an interval of 60°, in order to receive each end of post 1. The first end of post 1 is rotatably supported by channel part 8a by way of rotation axis 9. In this way, each of posts 1 can rotate in a plane which is perpendicular to a plane containing central joint 8, and stop at arbitral position. As a result, it can be in a flexed state, which is a state between a folded state and an unfolded state, as shown in FIG. 2. In this connection, a central connection angle α, which is the angle between first post part 2 of each post 1 and central joint 8, can be set arbitrary. In addition, a flexion angle β, which is the angle made by two post parts by way of post-midpoint joint 4, can also be set arbitrary.

Figure 4:
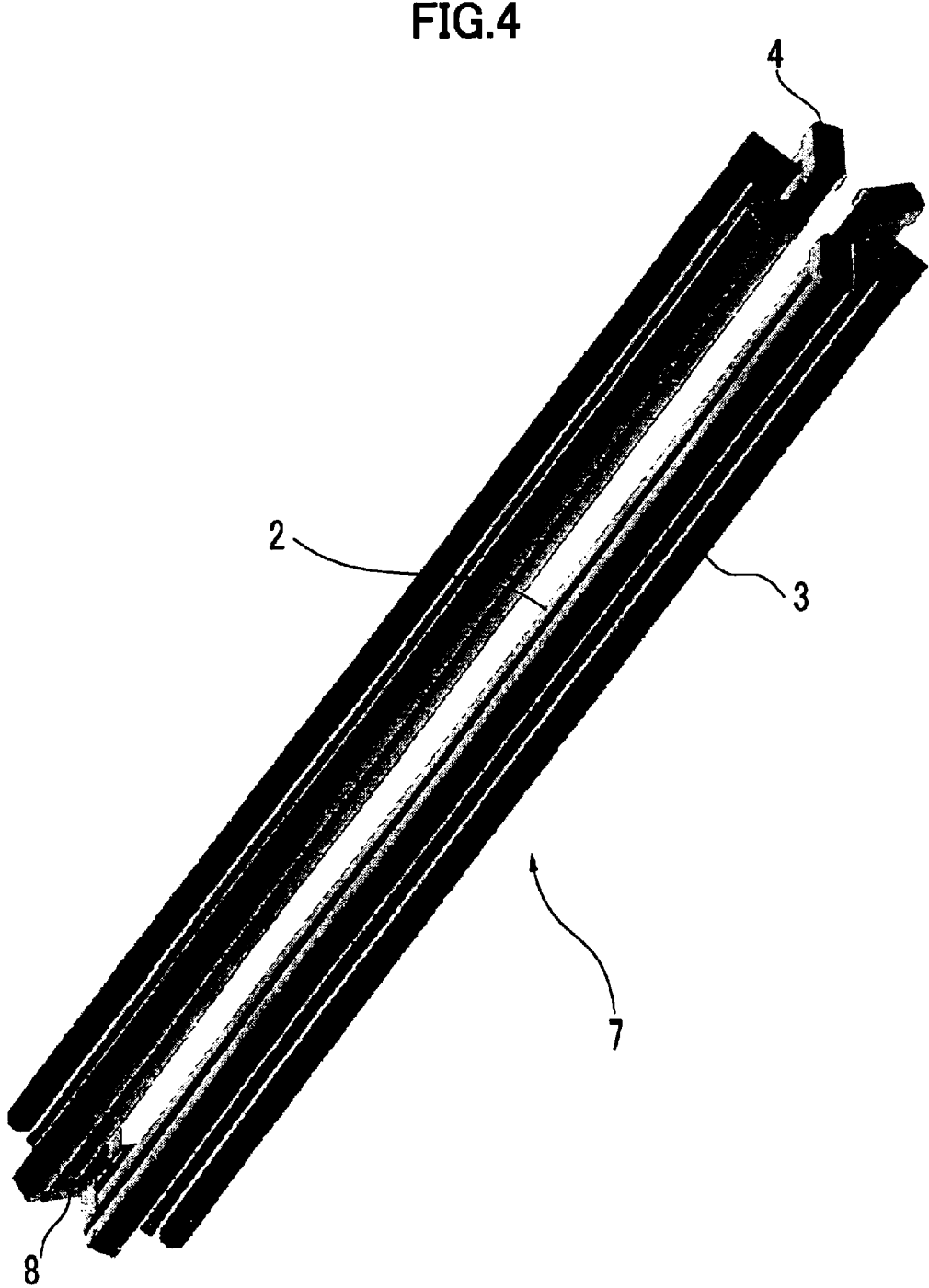
FIG. 4 is a perspective view showing a folded state of the structural unit.

In this connection, mechanisms which enables post 1 to stop at an arbitral position within the perpendicular plane and which makes the two post parts stop by setting a flexion angle β by post-midpoint joint 4 arbitrary themselves have been known. For example, a friction force between the inner surface of channel part 8a of central joint 8 and the outer surface of post 1 can be used for this purpose. In the folded state of six-pieces structural unit 7, each of posts 1 extends perpendicularly to a plane containing central joint 8. On the other hand, in the unfolded state, each of the posts are disposed such that it extends in the same plane as the one containing central joint 8 and that it extends radially from central joint in an interval of 60°. As shown in FIG. 4, structural unit 7 can be in folded state. In this case, each of the posts is folded by way of post-midpoint joint 4 such that post parts 2, 3 extend completely parallel to each other, and extends perpendicularly to central joint 8. Alternatively, each of posts 1 can be put up in a folded state by way of post-midpoint joint 4, or in another folded state such that six posts 1 extend perpendicularly to central joint 8 without folding post 1 by way of post-midpoint joint 4. In this case, the folded state becomes longer than the stick-shape state shown in FIG. 4 where post 1 is folded.

As just described, in its unfolded state, structural unit 7 is positioned and disposed such that its six posts extend radially from central joint 8 within substantially one plane. Thus, a line connecting the other ends of the six posts of the structural unit forms substantially an equilateral hexagon.

On the other hand, in its folded state, the six-pieces structural unit is bound at the first end by way central joint 8, and is foldable such that the six posts extend parallel to each other by way of central joint 8.

Figure 5:
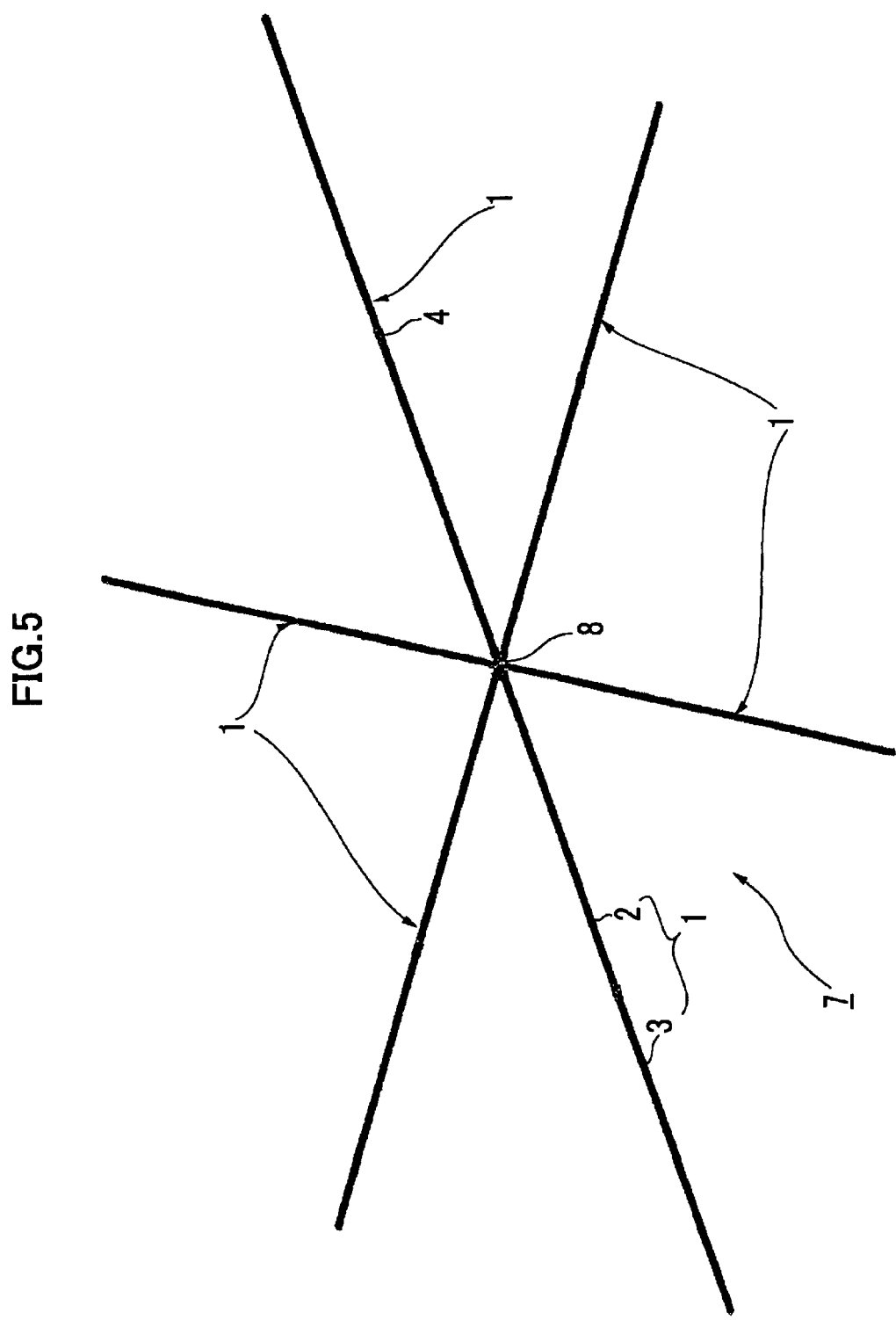
FIG. 5 is a perspective view showing an unfolded state of the structural unit.

As described above, when each of posts 1 of structural unit 7 has a flexed state satisfying:

$$\beta = 2 \times (90° - \alpha)$$

where $\alpha$ is a connection angle between post 1 of structural unit 7 and central joint 8 at the first end, and $\beta$ is a flexion angle of the post in its flexed state between the unfolded state and the folded state at the post-midpoint joint, all of the ends of posts 1 at the opposite side from central joint (the second ends) locate in the same plane as the one containing central joint 8. As a result, both ends of all the posts always lie on the same plane. When $\alpha$ is 0 degree, all of posts 1 constituting structural unit 7 are unfolded in the same plane as shown in FIG. 5, and thus tow-dimensional (planer) structure is formed. When $\alpha$ is 90 degrees, posts 1 constituting structural unit 7 are bound into a stick-shape as shown in FIG. 4, and thus have a compact form.

In addition to six-pieces structural unit 7, the frame structure may further have elongated connecting posts 10 being disposed in their flexed states such that they connect the second ends of adjoining posts of structural unit 7 to each other, and tip joints 11 for connecting the second end of the post of the structural unit 7 to a pair of ends of the connecting posts locating at both sides of the second end.

Figure 6:
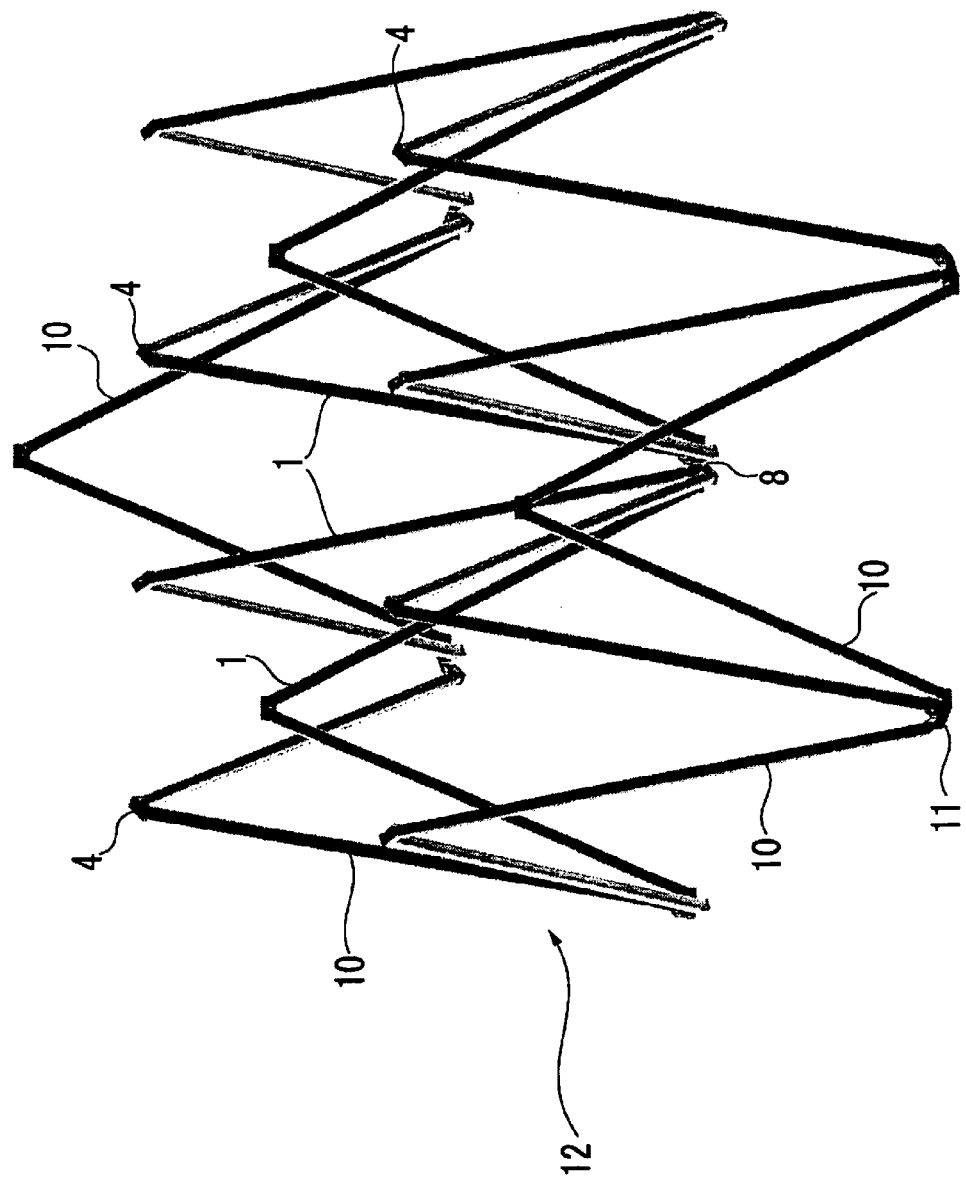
FIG. 6 is a perspective view showing a flexed state of the frame structure having twelve-pieces combination.
Figure 7:
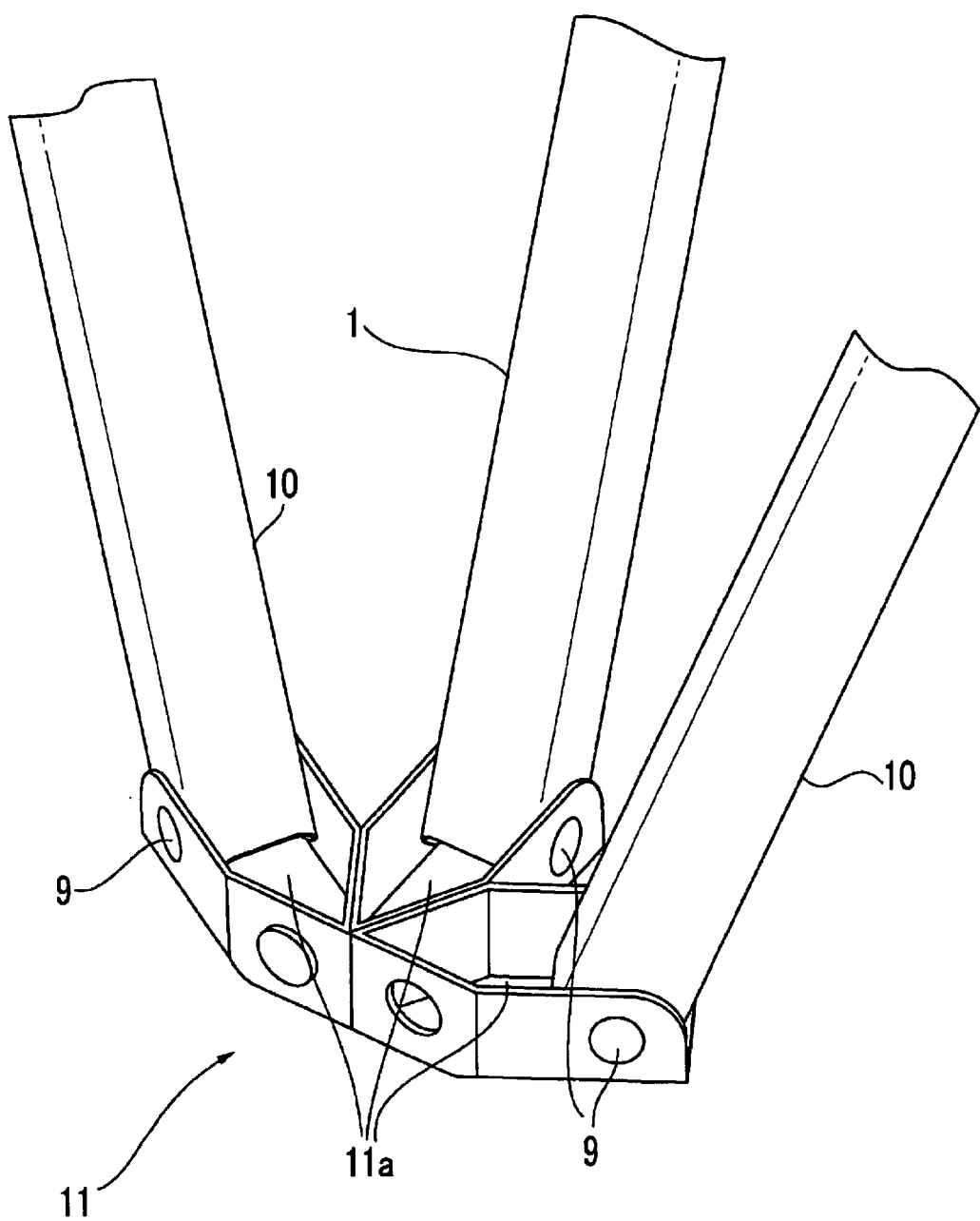
FIG. 7 is a perspective view showing the tip joint in use.

As such, by using connecting post 10 having the same structure as post 1, and by connecting each second end around six-pieces structural unit 7 shown in FIG. 2 with them, twelve-pieces frame structure 12 is formed as shown in FIG. 6. In that regard, tip joint 11 as shown in FIG. 7 is used to connect the ends of three posts.

Tip joint 11 has a structure which corresponds to a half of the above-described central joint 8. Specifically, in order to receive three ends of the connecting posts rotatably, it has channel part 11a and rotation axis 9 which have the same structure as channel part 8a of central joint 8.

Figure 8:
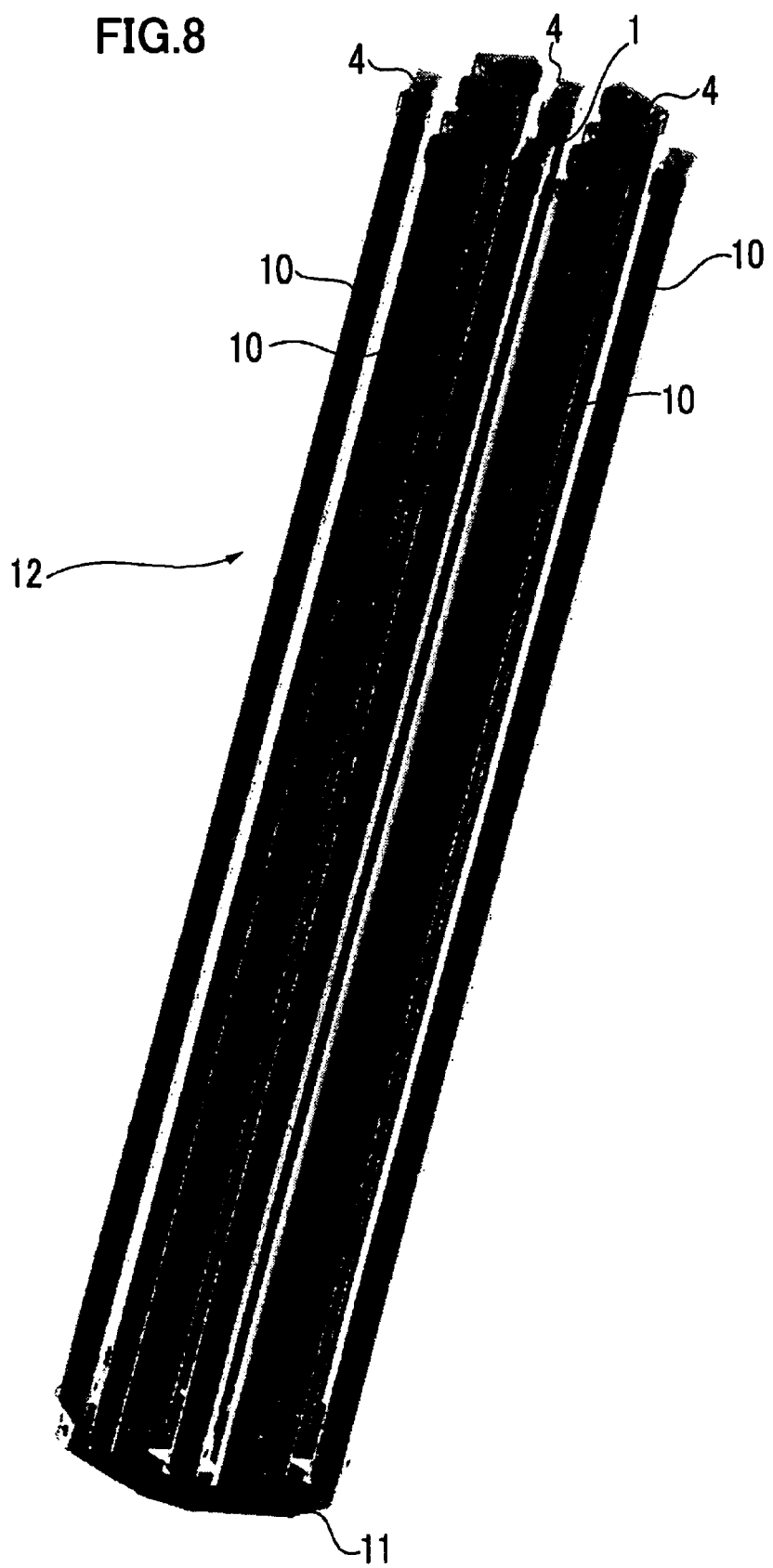
FIG. 8 is a perspective view showing a folded state of the frame structure having twelve-pieces combination.
Figure 9:
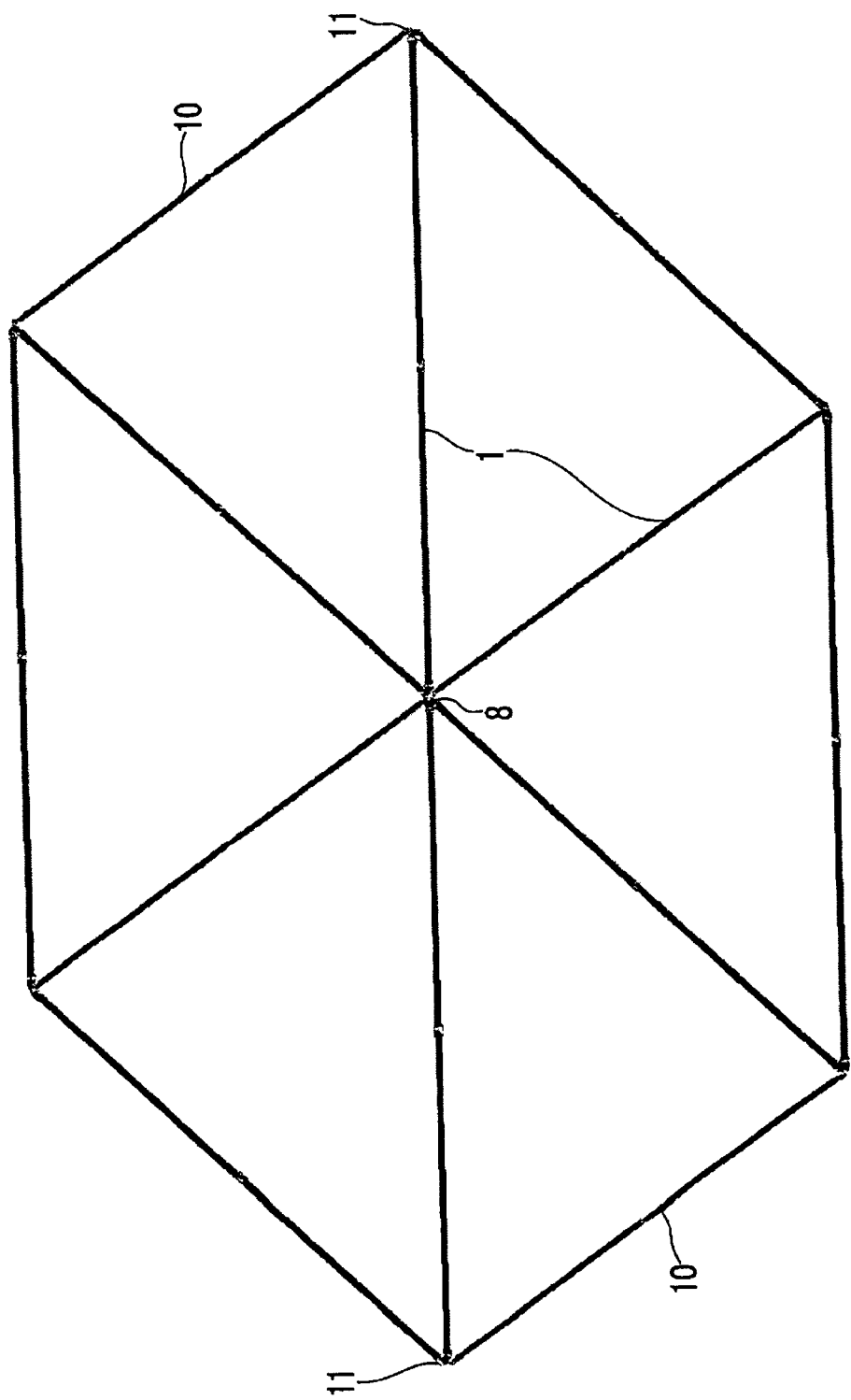
FIG. 9 is a perspective view showing an unfolded state of the frame structure having twelve-pieces combination.

Referring to FIG. 8, when $\alpha$ is 90 degrees in twelve-pieces frame structure 12 which has a circumference as just described, the frame structure has a stick-shape folded state similar to the one shown in FIG. 4. On the other hand, when $\alpha$ is 0 degree, a planer hexagonal frame structure as shown in FIG. 9 is formed. In comparison with the structure shown in FIG. 2 which has only six-pieces structural unit, the frame structure having this circumference has been improved in structural stiffness in the course and after the completion of unfolding thereof due to connecting post 10 contained therein.

Figure 10:
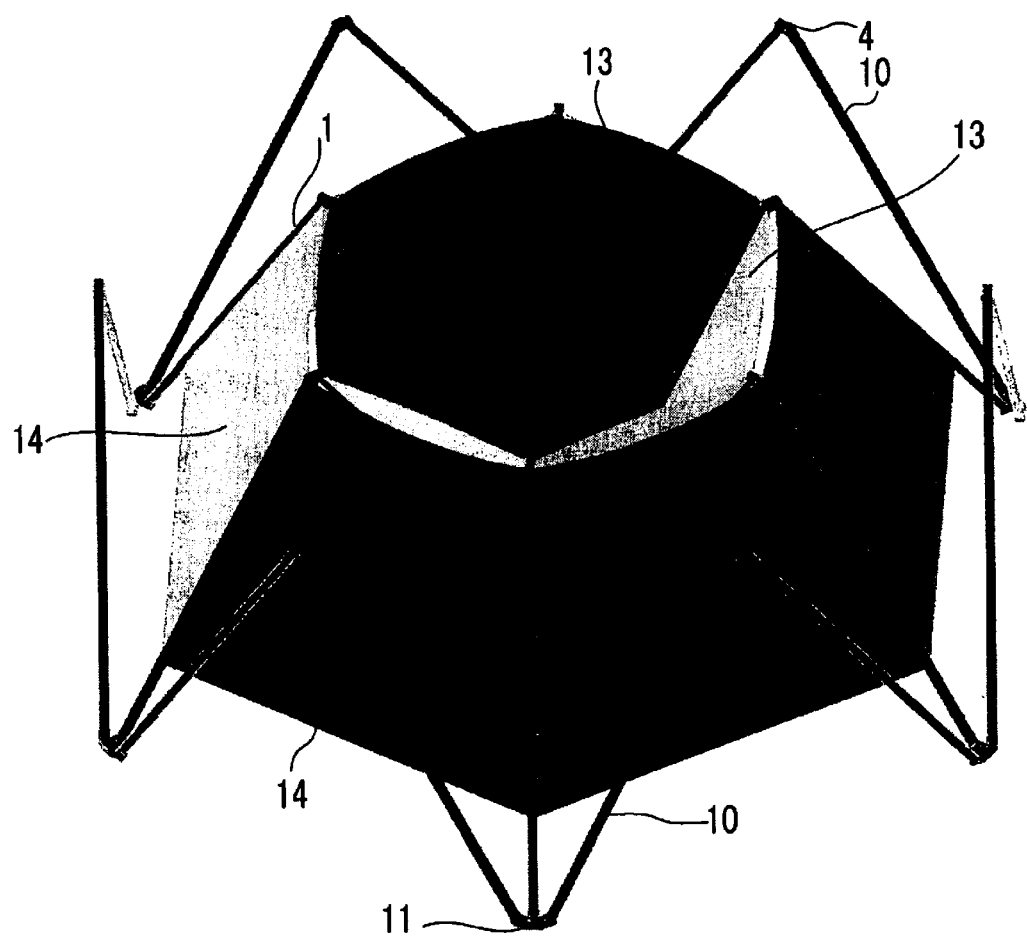
FIG. 10 is a perspective view showing a flexed state of the frame structure containing a frame structure having twelve-pieces combination and a membrane member attached thereto.

Referring to FIG. 10, a structure obtained by combining twelve-pieces frame structure 12 shown in FIG. 6 with membrane members. Specifically, in FIG. 10, the frame structure further has first membrane member 13 spread in a plane formed by adjoining first post parts 2 which are the parts of posts 1 of structural unit 7 from central joint 8 to post-midpoint joints 4, and second membrane member 14 spread in a plane formed by adjoining second post parts 3 which are the parts of posts of structural unit 7 from post-midpoint joints 4 to the second ends.

First and second membrane members 13, 14 form, in the unfolded state, a membranous structure of equilateral hexagon whose center is central joint 8 in one plane. In the folded state, first and second membrane members 13, 14 are contained by cooperating with posts 1 and connecting posts 10 of structural unit 7.

Figure 11:
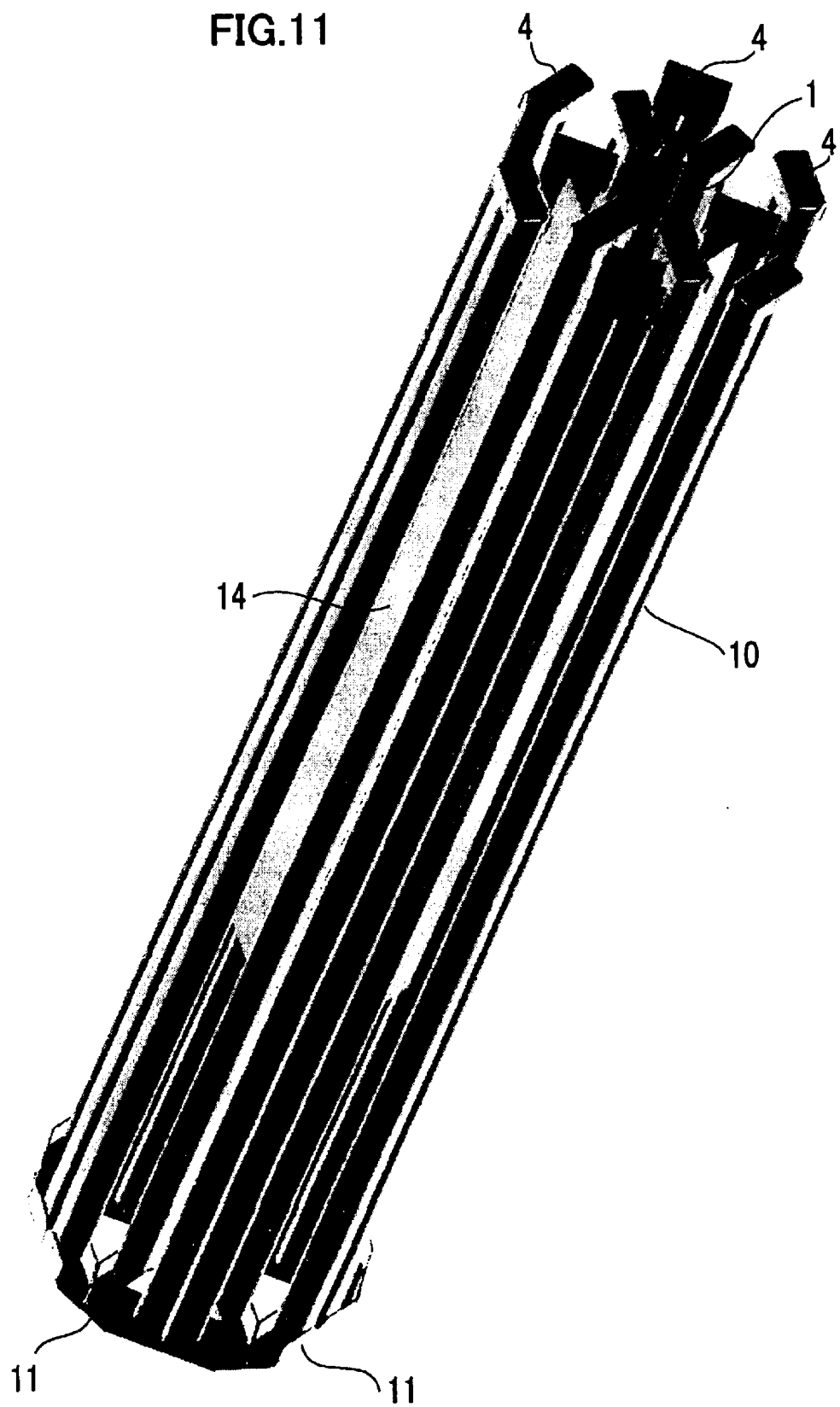
FIG. 11 is a perspective view showing a folded state of the frame structure of FIG. 10.
Figure 12:
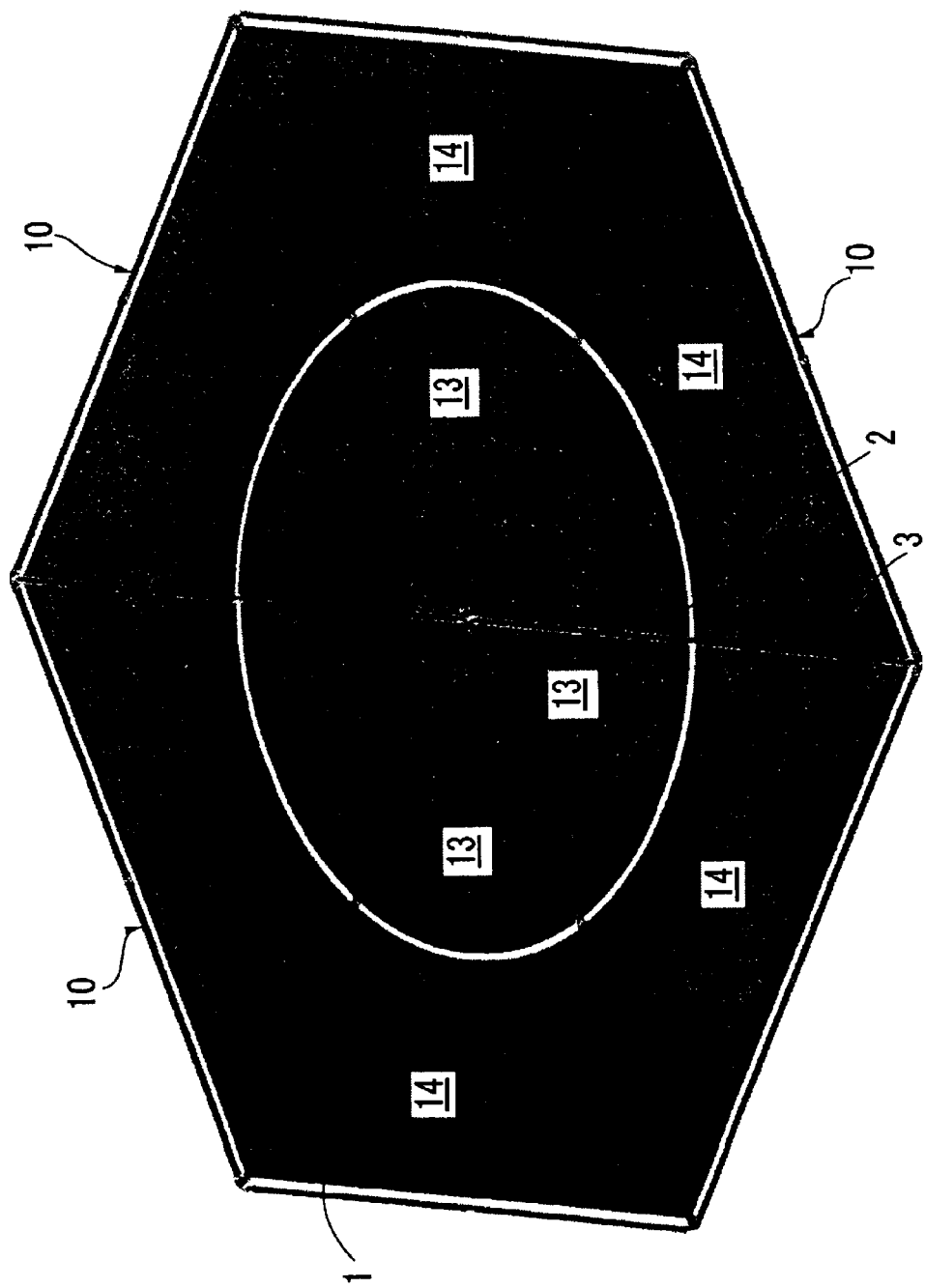
FIG. 12 is a perspective view showing an unfolded state of the frame structure of FIG. 10.
Figure 13:
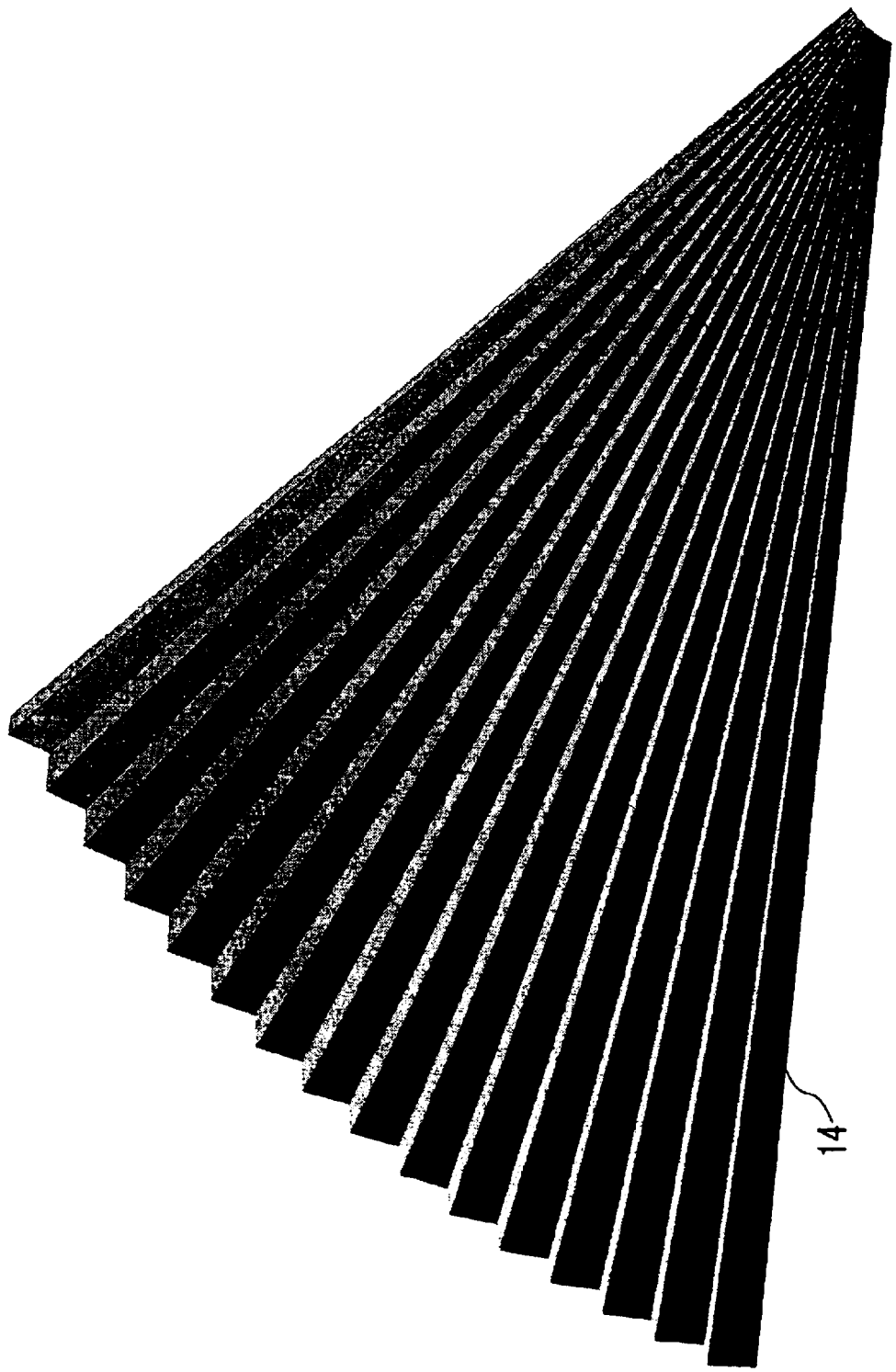
FIG. 13 is a perspective view showing the state of the membrane member in the mid course to the folded state.

This frame structure having the membranous member is desirable for equipping sheet structures such as a solar battery membrane. Referring to FIG. 12, explanation will be made for a procedure for spreading a membrane member on the whole surface of the frame structure which contains structural unit 7 and connecting post 10 as shown in FIG. 9. When the length of the post is L, the length of one side of the frame structure shown in FIG. 12 is also L. In addition, the length of one side of the equilateral triangle constituting the hexagon is L. As a result, the position of post-midpoint 4 which locates at the midpoint of each post 1 is L/2. Since this poison is the part for folding, the membrane member is cut along the line formed by drawing a circle having central joint as its center and a radius of L/2 as shown in FIG. 12. Thus, the outer end of first membrane member 13 forms one sixth arc, and the inner end of second membrane member 14 forms an arc having a shape which conforms with the outer end of first membrane member 13. By providing the connection angle $\alpha$ and the flexion angle $\beta$ in the structure with a predetermined relationship, the membranous structure having the folded state which corresponds to the form shown in FIG. 6 is obtained as shown in FIG. 10. As such, by folding posts 1 of structural unit 7 at their midpoints, the frame structure will be in a compact folded state, and put away easily. In this regard, the frame structure can be folded without detaching membranous members 13, 14 as shown in FIG. 11. In that case, membranous members 13, 14 can be contained between posts 1 and between connecting posts 10 which are folded into a stick shape. In addition, the membranous members can be wound around the stick-shaped frame structure, or folded into accordion shape as shown in FIG. 13.

Referring to FIGS. 14 to 19, yet other embodiment of the frame structure will be explained. This structure is obtained by combining arbitral numbers of twelve-pieces frame structure 12 containing six-pieces structural units 7 in arbitral directions. For this purpose, the frame structure further has unit-connecting joints 15 for rotatably supporting each second end of posts 1 of adjoining structural units 7 and each one end of a pair of connecting posts 10, or each second end of posts 1 of three neighboring structural units 7 and each one end of three connecting posts 10 accompanying with the structural units. Thus, a plurality of structural units 7 are connected to each other by way of unit-connecting joints 15.

Figure 16:
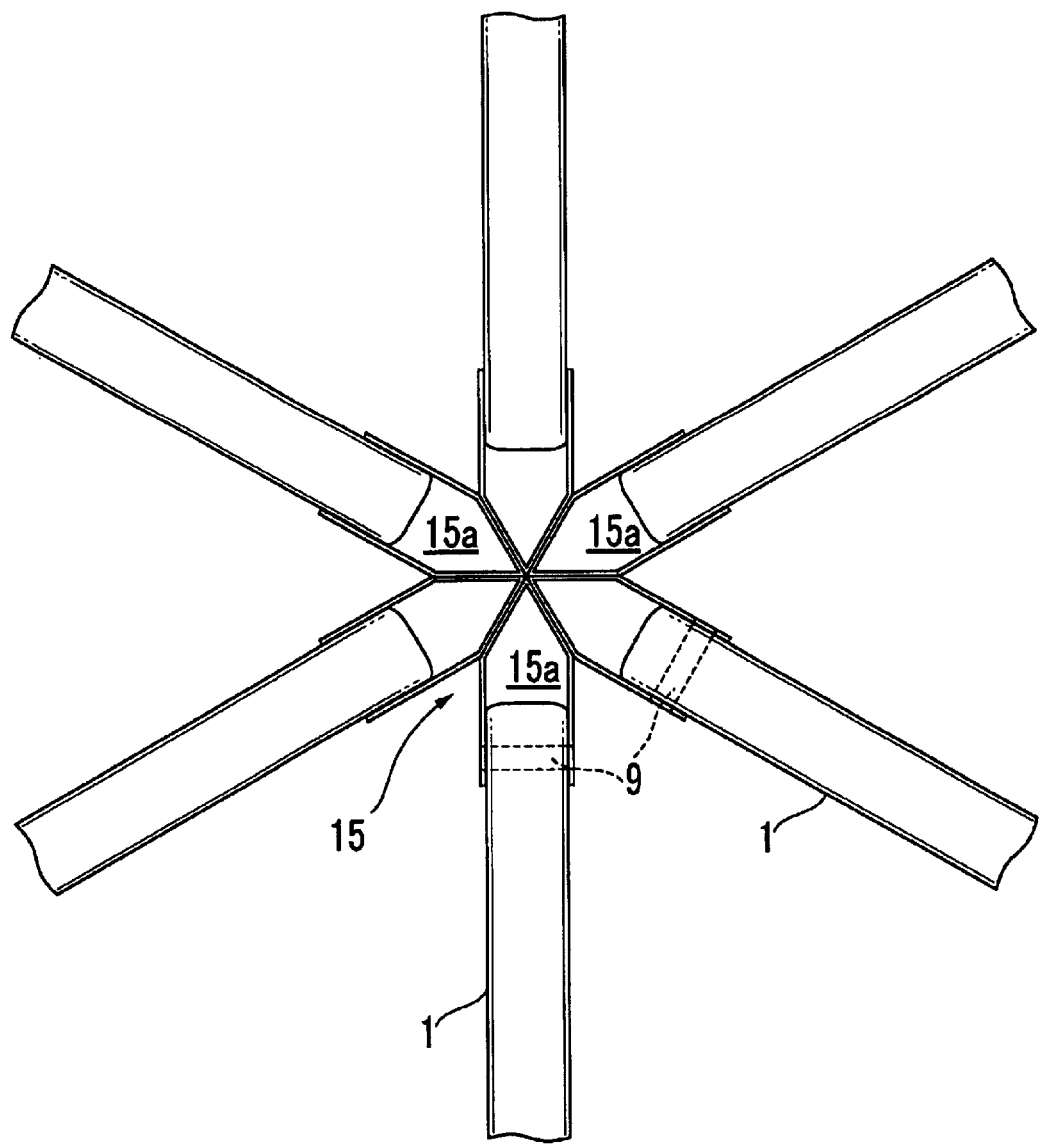
FIG. 16 is a plane view showing the unit-connecting joint in use.

Referring to FIG. 16, unit-connecting joint 15 has receiving parts 15a in an peripheral direction at an interval of 60°, and thus a similar structure to central joint 8.

Figure 14:
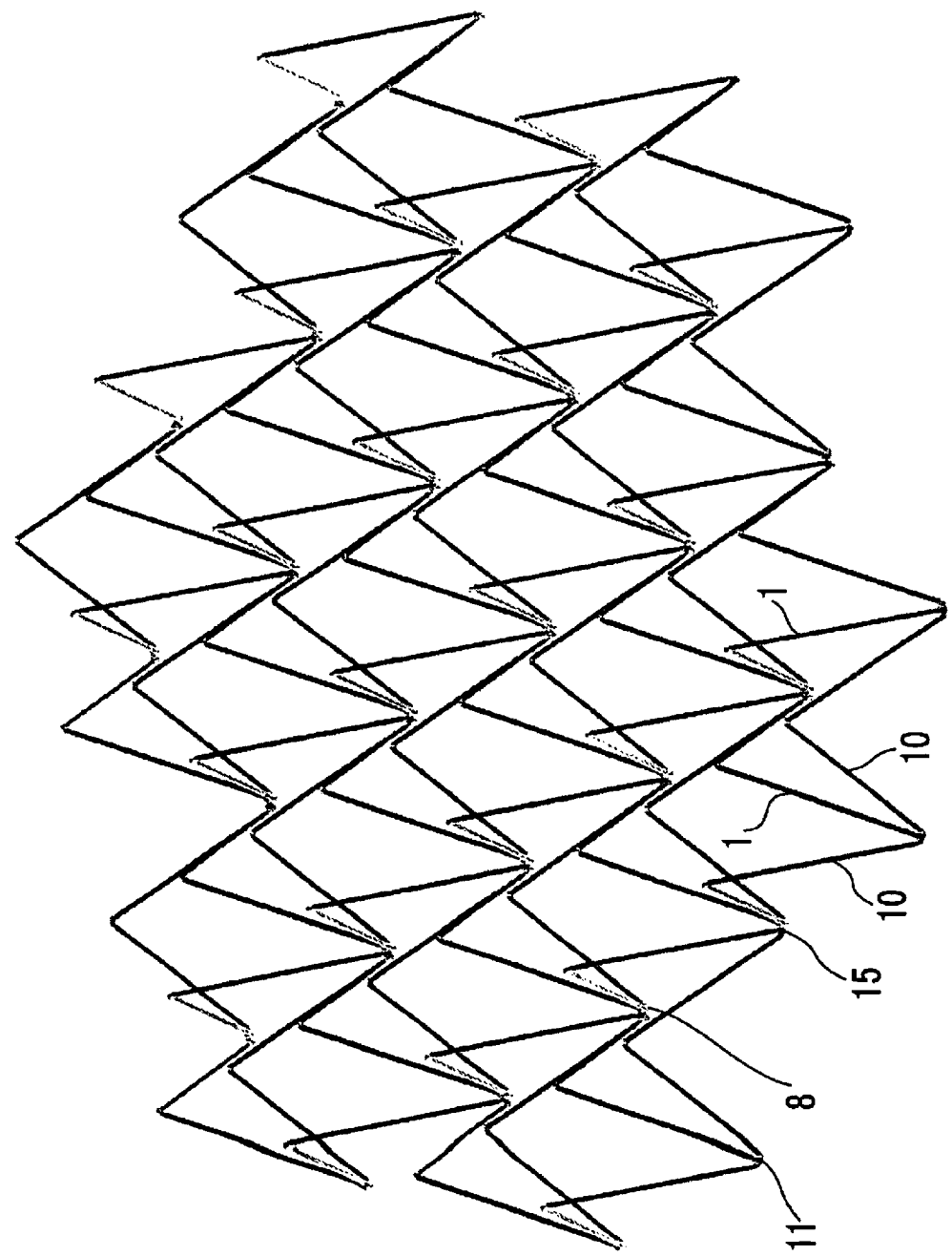
FIG. 14 is a perspective view showing a flexed state of a combination of plurality of the frame structure having twelve-pieces combination.
Figure 15:
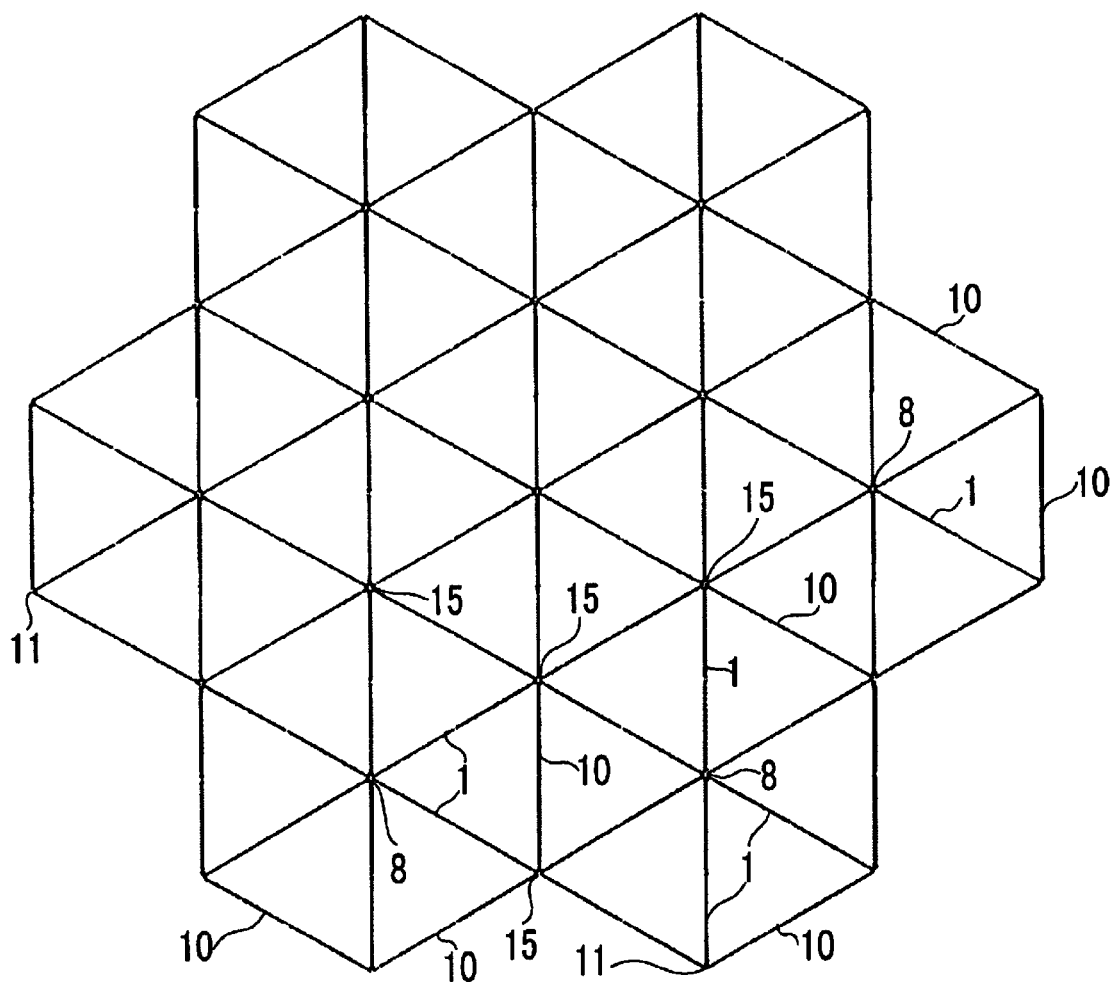
FIG. 15 is a plane view showing an unfolded state of the frame structure of FIG. 14.
Figure 17:
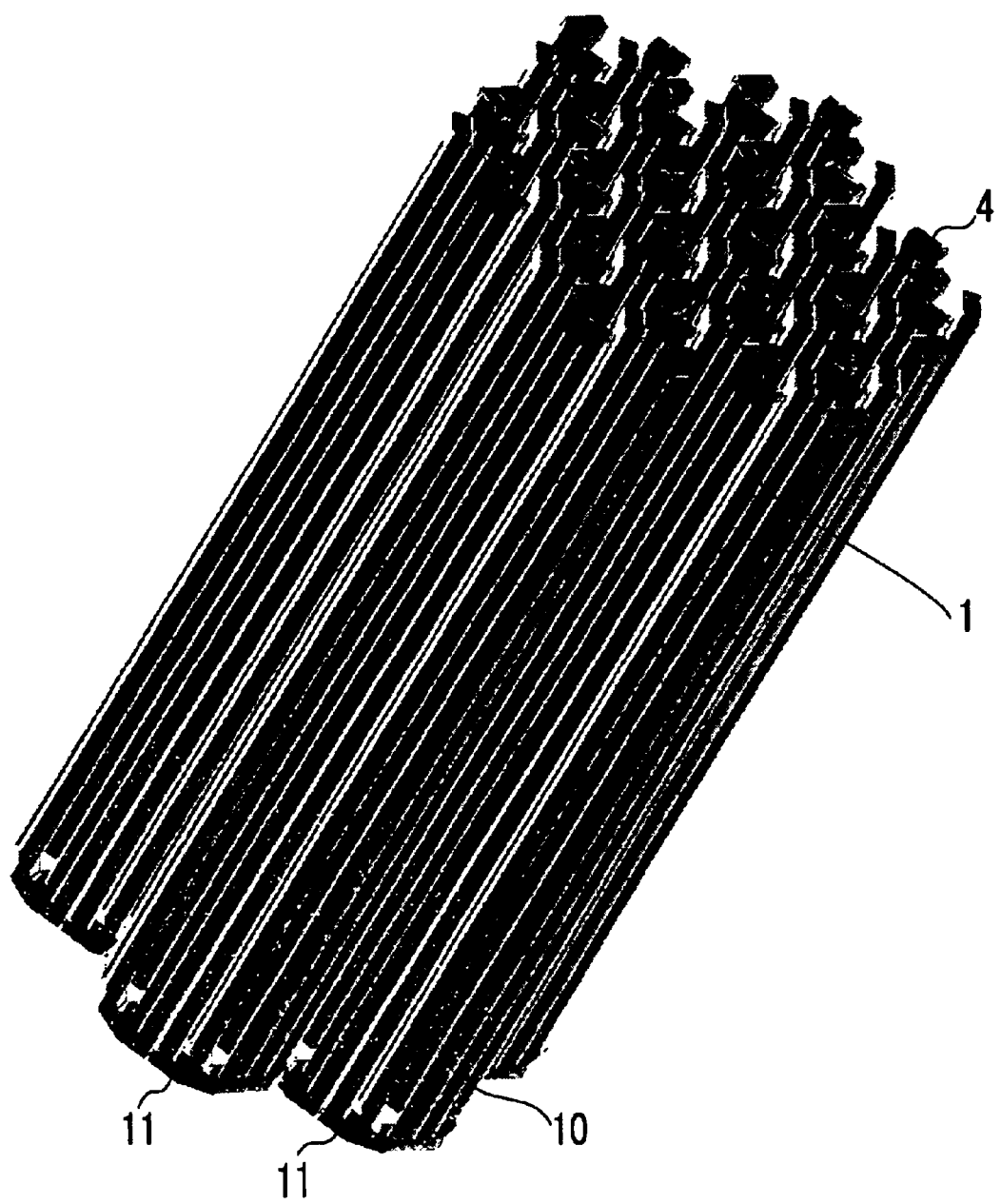
FIG. 17 is a perspective view showing a folded state of the frame structure of FIG. 14.
Figure 18:
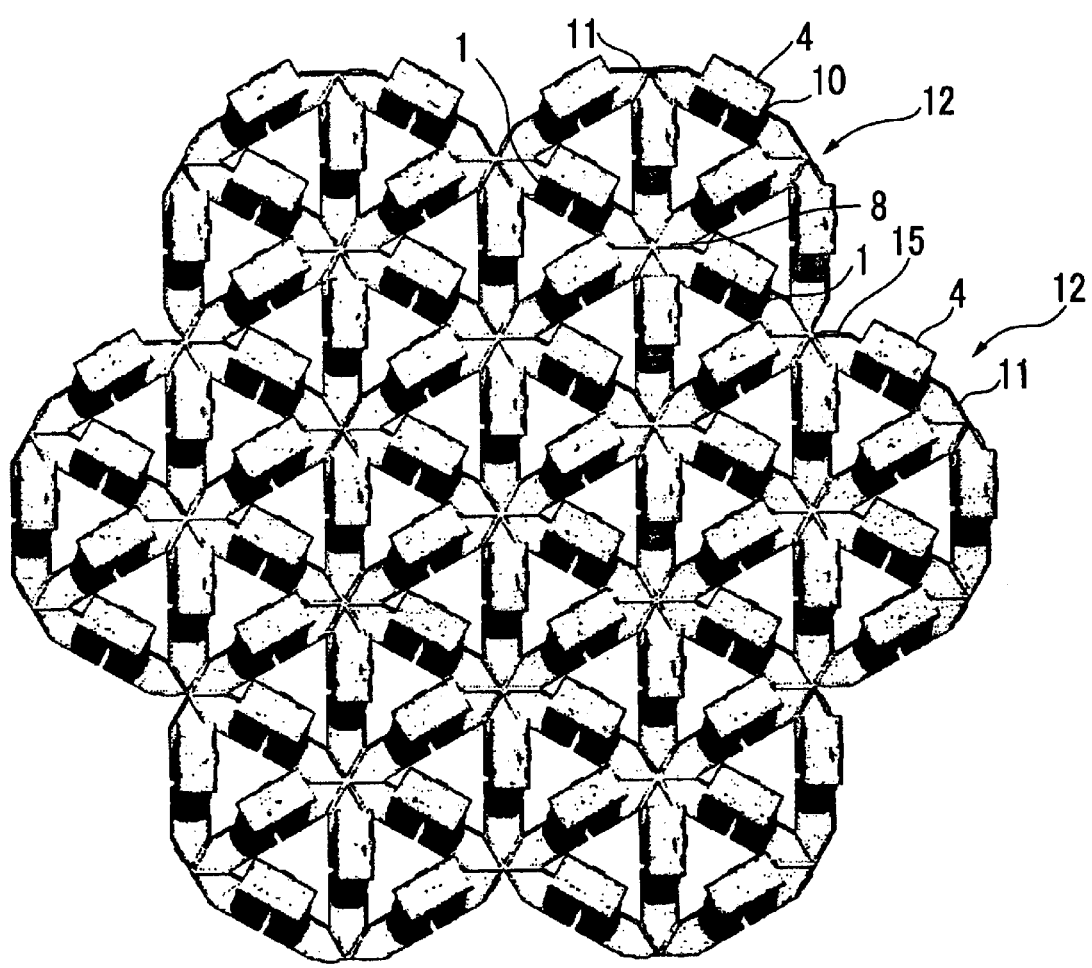
FIG. 18 is a terminal-face view showing a folded state of the frame structure of FIG. 14.
Figure 19:
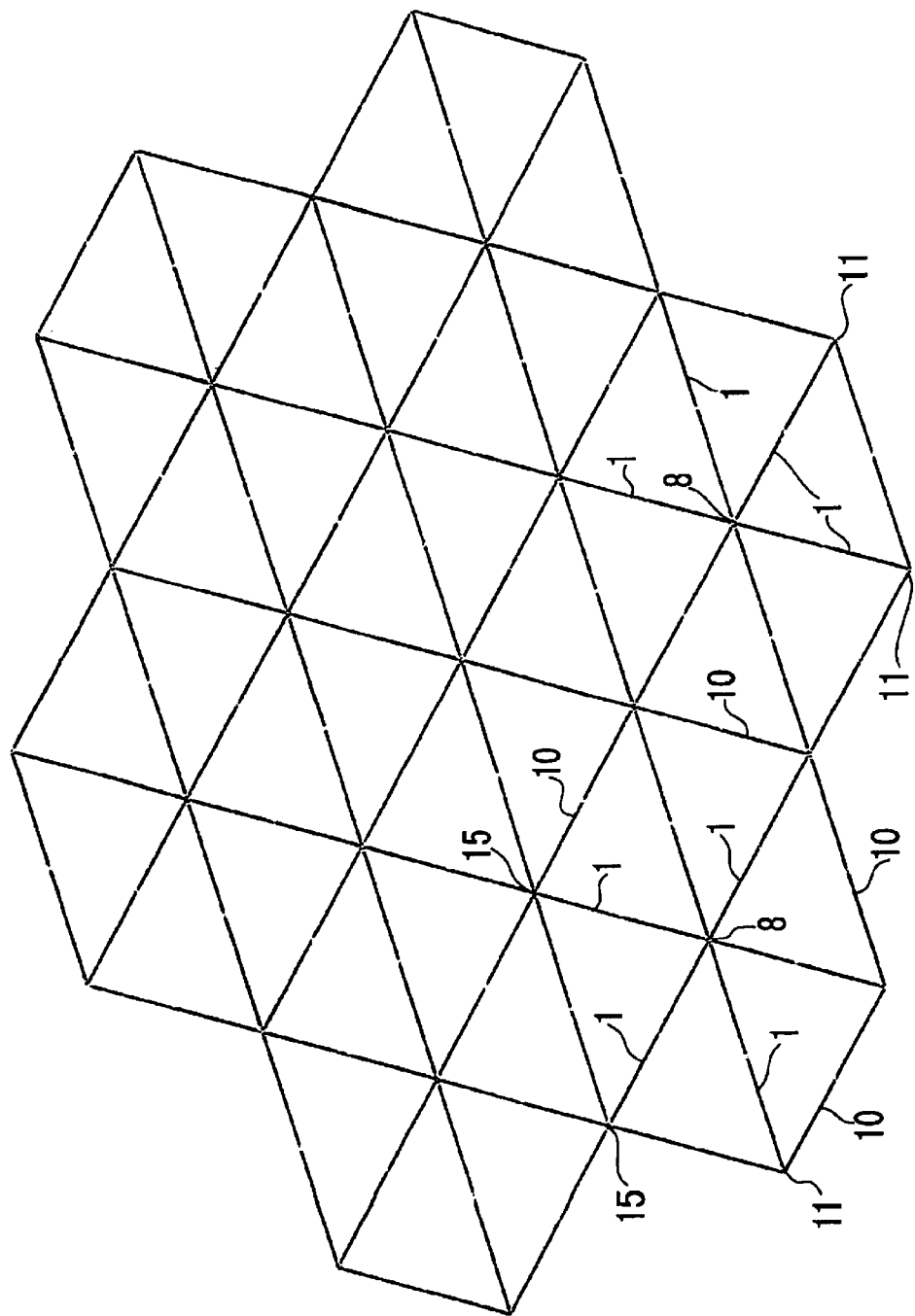
FIG. 19 is a perspective view showing an unfolded state of the frame structure of FIG. 14.

By using unit-connecting joint 15, an arbitral numbers of the frame structures containing structural units 7 and connecting posts 10 shown in FIG. 6 can be combined to form a frame structure as shown in FIG. 14. FIG. 14 shows a structure constituted by using seven structural units 7. FIG. 15 is a plane view showing this structure in an unfolded state, namely, as a two-dimensional structure. FIG. 17 is a perspective view showing a folded state of the frame structure. FIG. 18 is a terminal-face view showing a folded state shown in FIG. 17 as seen from an end of the structure. FIG. 19 is a perspective view of the unfolded state shown in FIG. 15.

Figure 20:
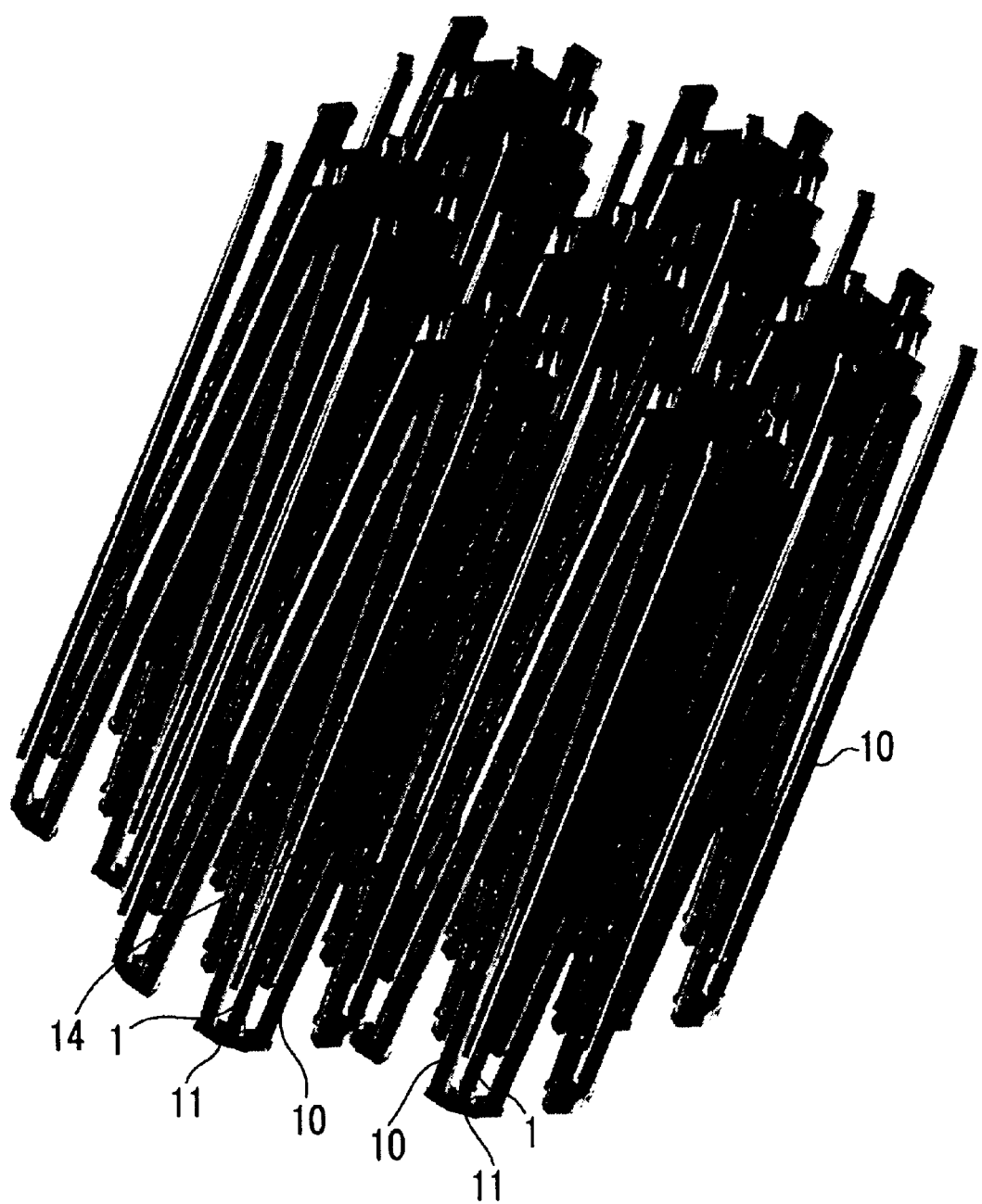
FIG. 20 is a perspective view showing a nearly folded state of the frame structure constituting of a combination of a plurality of the frame structure to which the membrane member is attached as shown in FIG. 10.
Figure 21:
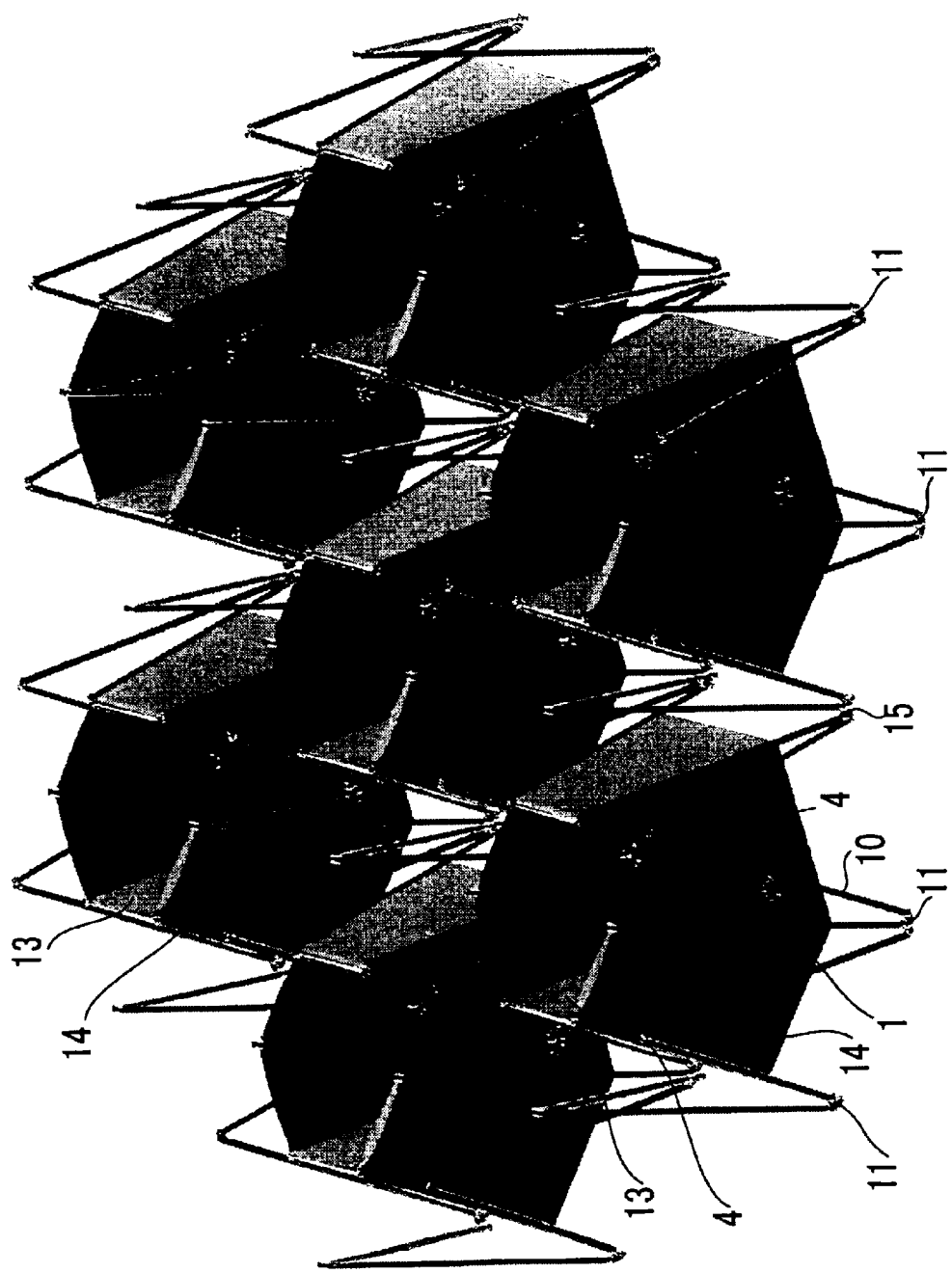
FIG. 21 is a perspective view showing a flexed state of the frame structure of FIG. 20.
Figure 22:
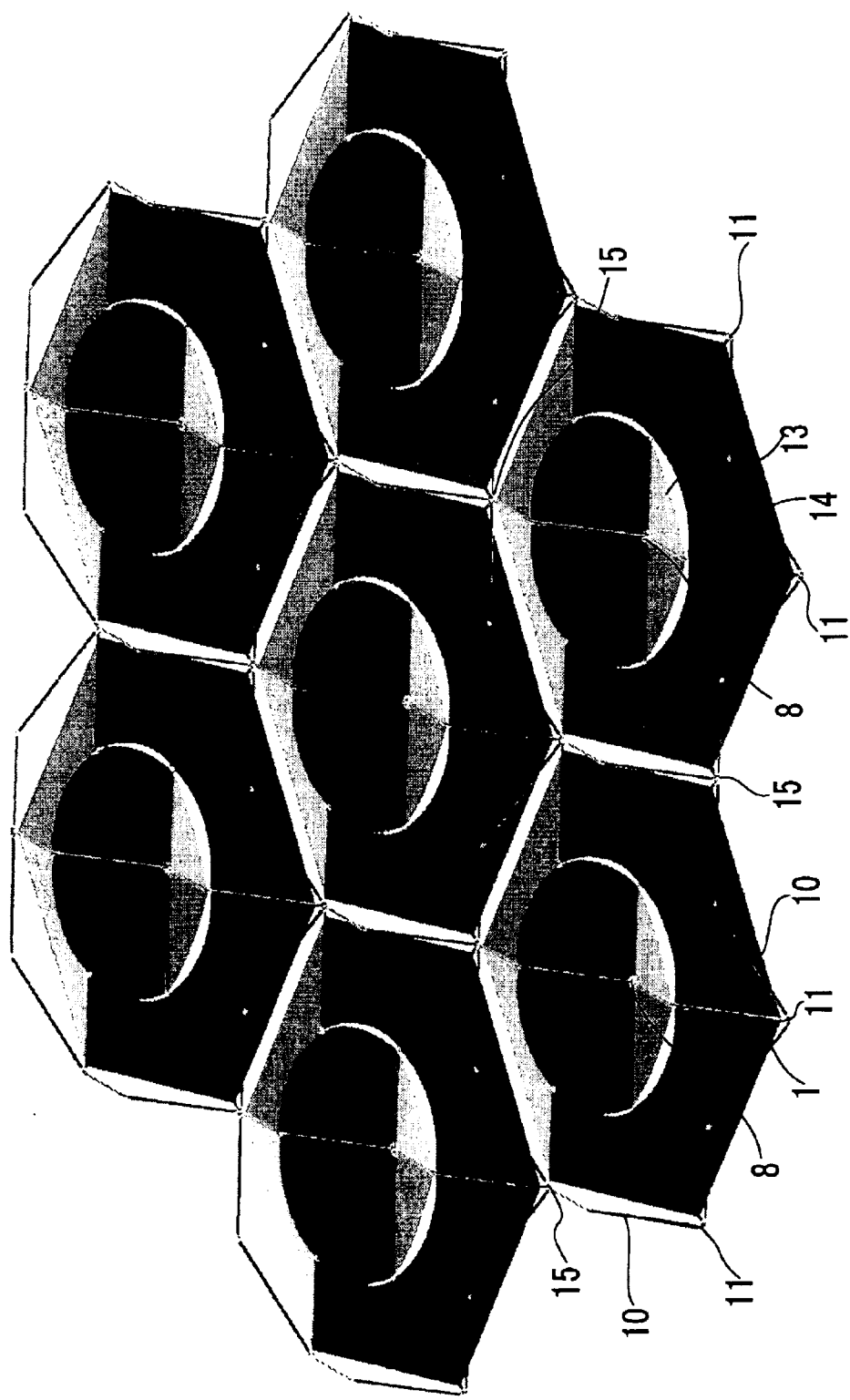
FIG. 22 is a perspective view showing a flexed state close to unfolded state of the frame structure of FIG. 20 having larger connecting angle.
Figure 23:
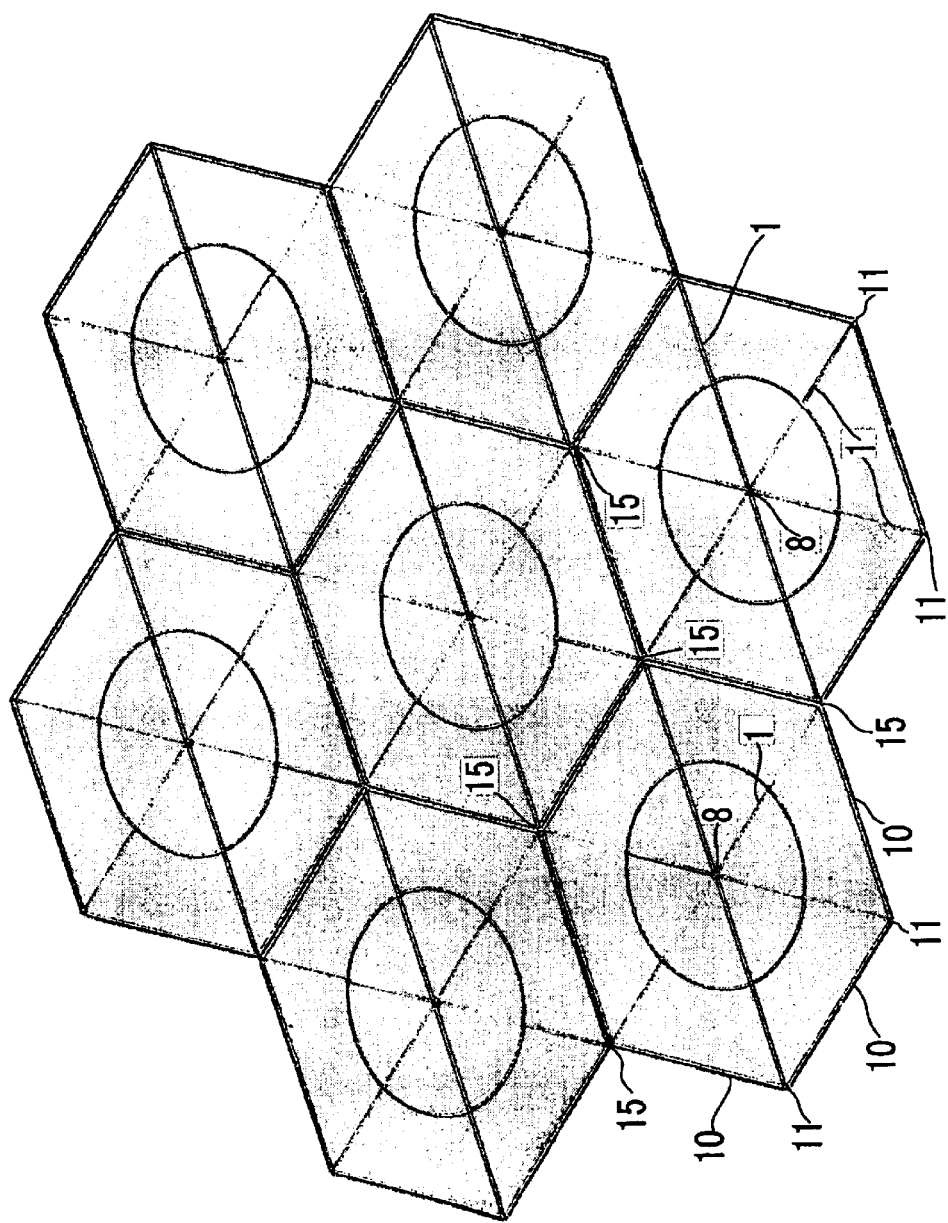
FIG. 23 is a developed view of the frame structure of FIG. 20.

Referring to FIGS. 20 to 23, another embodiment of the present invention will be explained. This embodiment is a frame structure having membranous member. This structure is obtained by adding a membrane member as shown in FIG. 10 to the frame structure shown in FIG. 14 which has a structure obtained by combining a plurality of the structure shown in FIG. 6 in which connecting posts are added to the structural unit. FIG. 20 shows this embodiment in a folded state corresponding to the one shown in FIG. 17. The membranous member of this embodiment contains first membranous member 13 and second membranous member 14 as shown in FIG. 10 or FIG. 12. FIG. 21 shows this embodiment in a flexed state corresponding to those shown in FIGS. 6, 10 and 14. The flexed state shown in FIG. 22 is obtained by increasing the flexion angle β in the flexed state shown in FIG. 21. FIG. 23 shows this embodiment in an unfolded state corresponding to those shown in FIGS. 5, 9, 12, 15 and 19.

Figure 24:
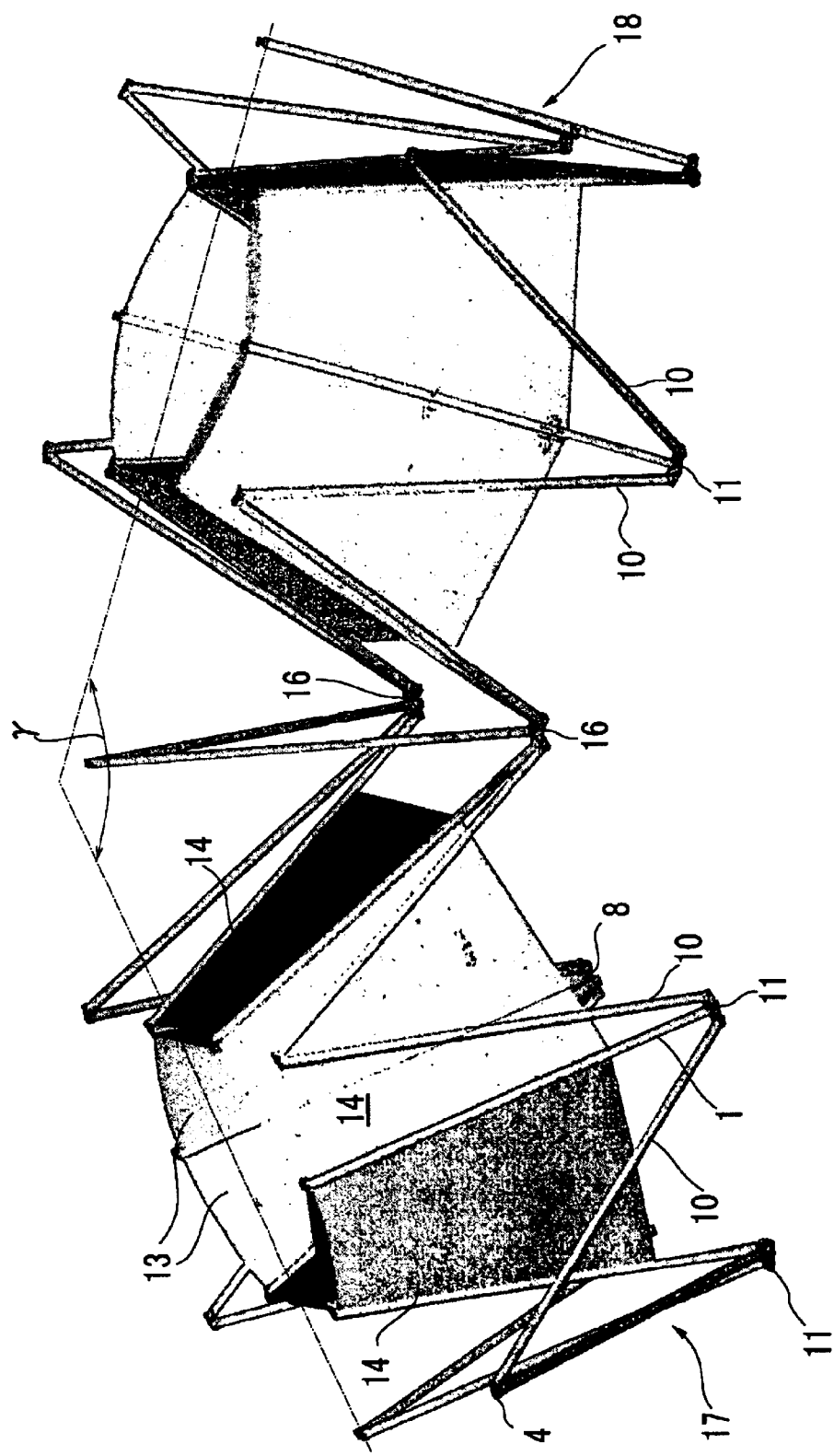
FIG. 24 is a perspective view of a frame structure obtained by connecting the frame structure of FIG. 10.
Figure 25:
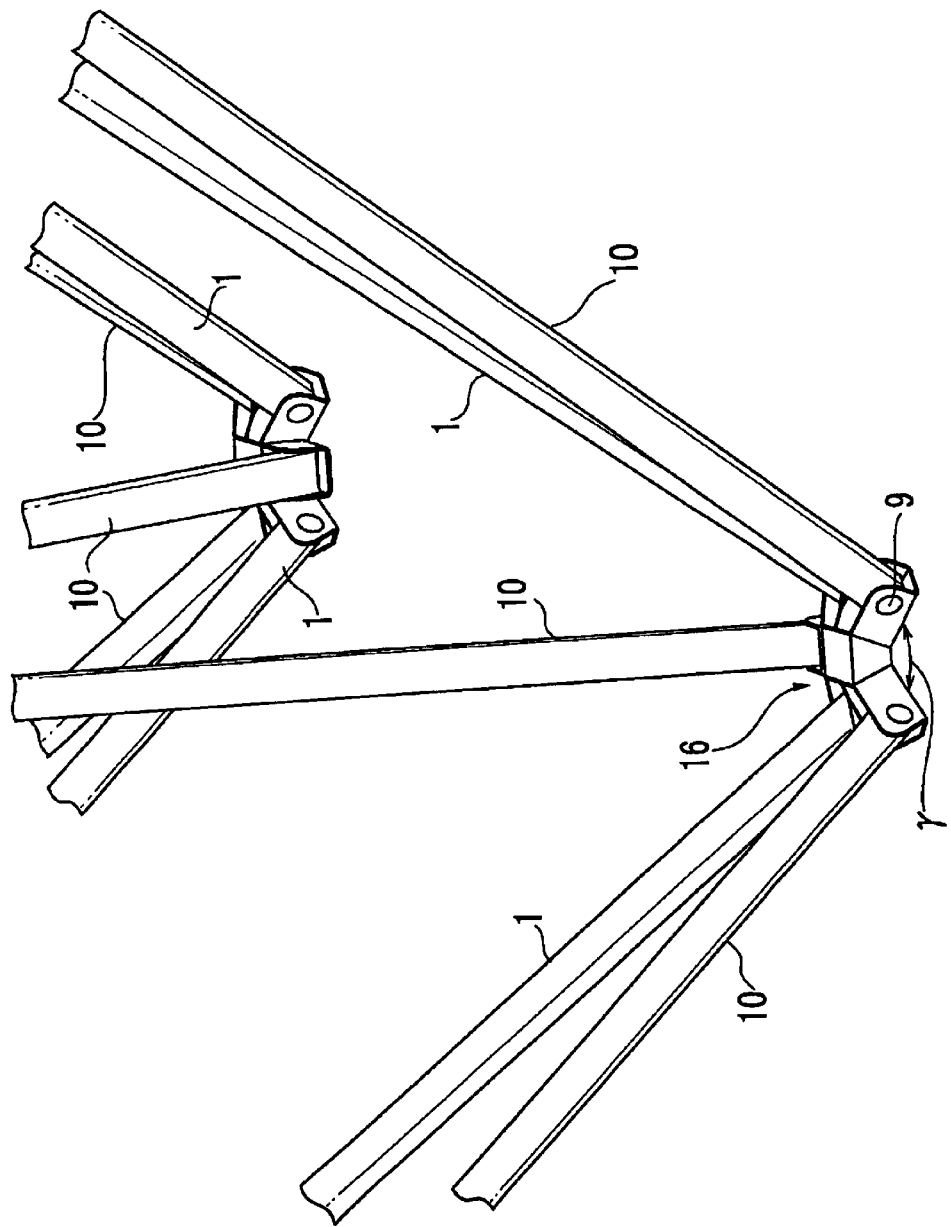
FIG. 25 is a perspective view showing the connecting-angle adjustable joint in use.

Referring to FIG. 24, yet another embodiment of the present invention is shown. In this embodiment of the present invention is obtained by combining a pair of structures in the flexed state containing structural unit 7, connecting posts 10 and membranous members 13, 14 attached thereto as shown in FIG. 10. In this embodiment, connecting angle adjustable joints 16 are used to adjust the connecting angle at a pair of connecting parts between two structural units 7. FIG. 25 is a perspective view showing the connecting-angle adjustable joint 16 in use. This connecting angle adjustable joint 16 is the same as central joint 8 in FIG. 3 and tip joint 11 in FIG. 7 in that it has rotation axis 12 for rotatably supporting the ends of posts 1, 11. On the other hand, connecting angle adjustable joint 16 is different from central joint 8 in FIG. 3 or tip joint 11 in FIG. 7 in that receiving parts 16a, 16a for containing the ends of the posts at the connecting part between first frame structure 17 having a structural unit 7 and connecting posts 10 and second frame structure 18 having a structural unit 7 and connecting posts 10 are not contained in the same plane but are definable at an arbitral angle. In other words, connecting angle γ between two frame structures (an angle between frame structures 17, 18 to be connected) can be decided arbitrarily.

Referring to FIGS. 26 to 29, yet another embodiment using connecting angle adjustable joint 16 is shown. This embodiment is a frame structure obtained by connecting the frame structure which can be in the flexed state of FIG. 10, the folded state of FIG. 11, and the unfolded state of FIG. 12, into a doughnut shape.

Figure 26:
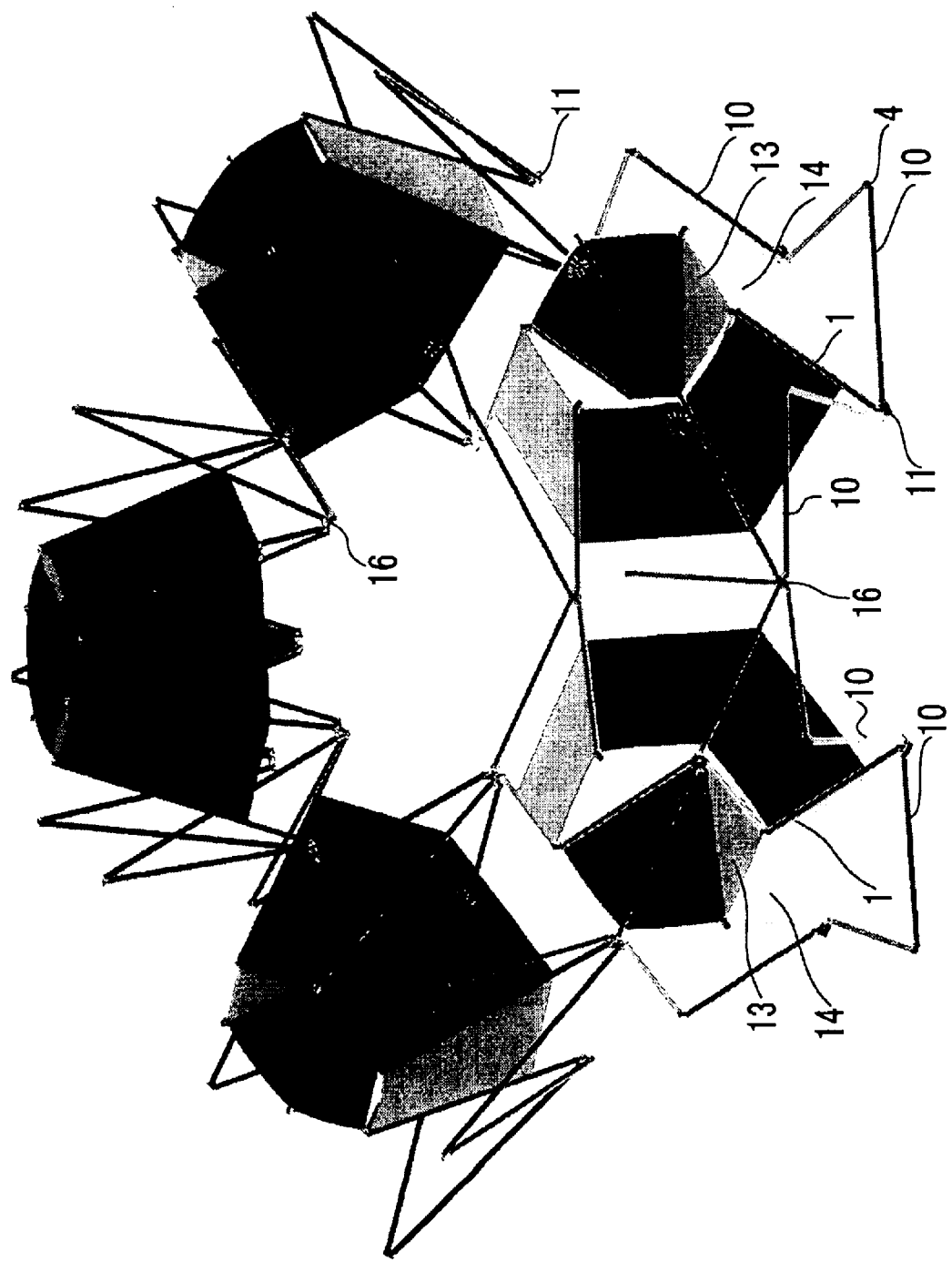
FIG. 26 is a perspective view of a connected frame structure obtained by connecting the frame structure of FIG. 10 in a doughnut shape using the connecting-angle adjustable joint.

FIG. 26 shows a flexed state corresponding to the one in FIG. 10.

Figure 27:
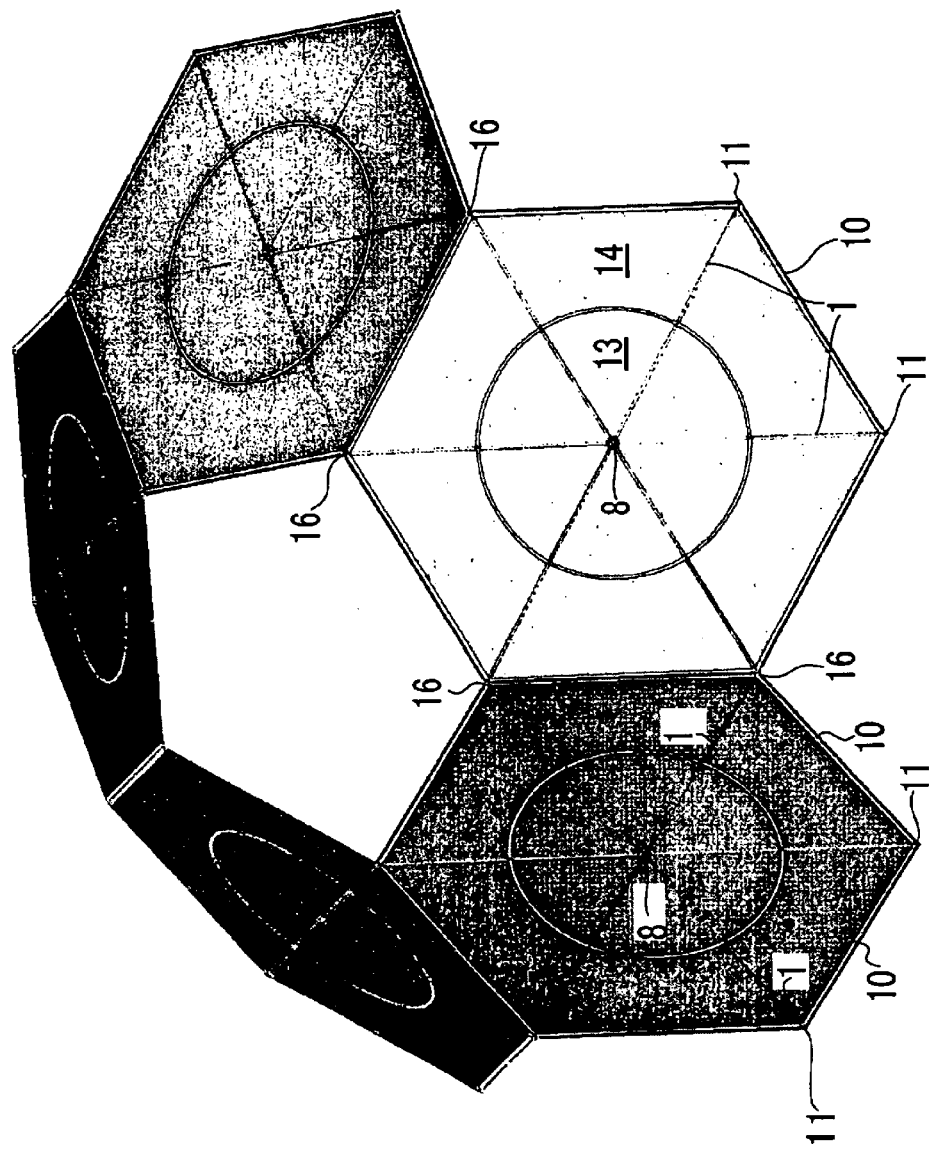
FIG. 27 is a perspective view showing an unfolded state of the connected frame structure of FIG. 16.

FIG. 27 shows an unfolded state corresponding to the one in FIG. 12.

Figure 28:
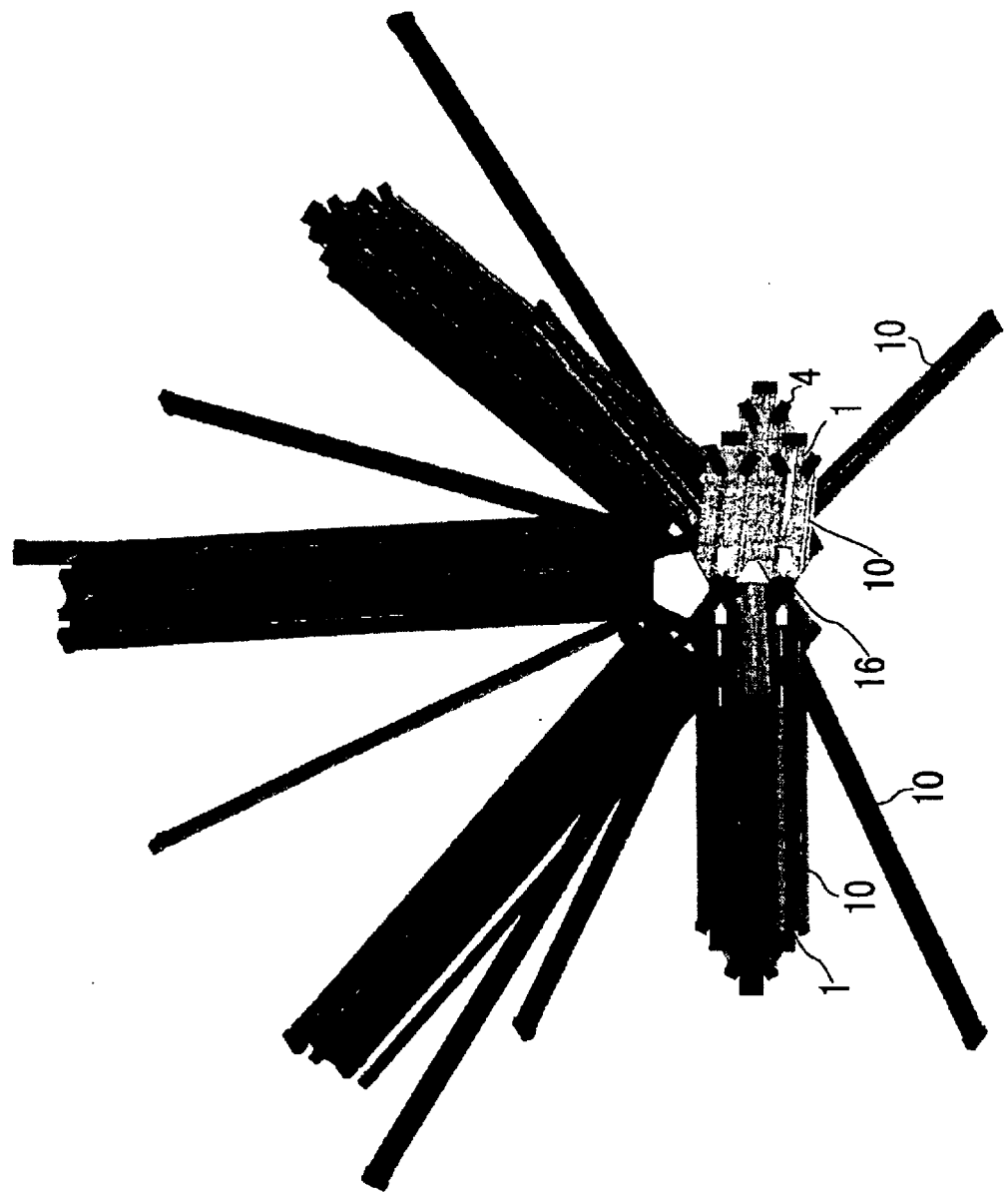
FIG. 28 is a perspective view showing a folded state of each of the frame structures constituting the connected frame structure of FIG. 26.
Figure 29:
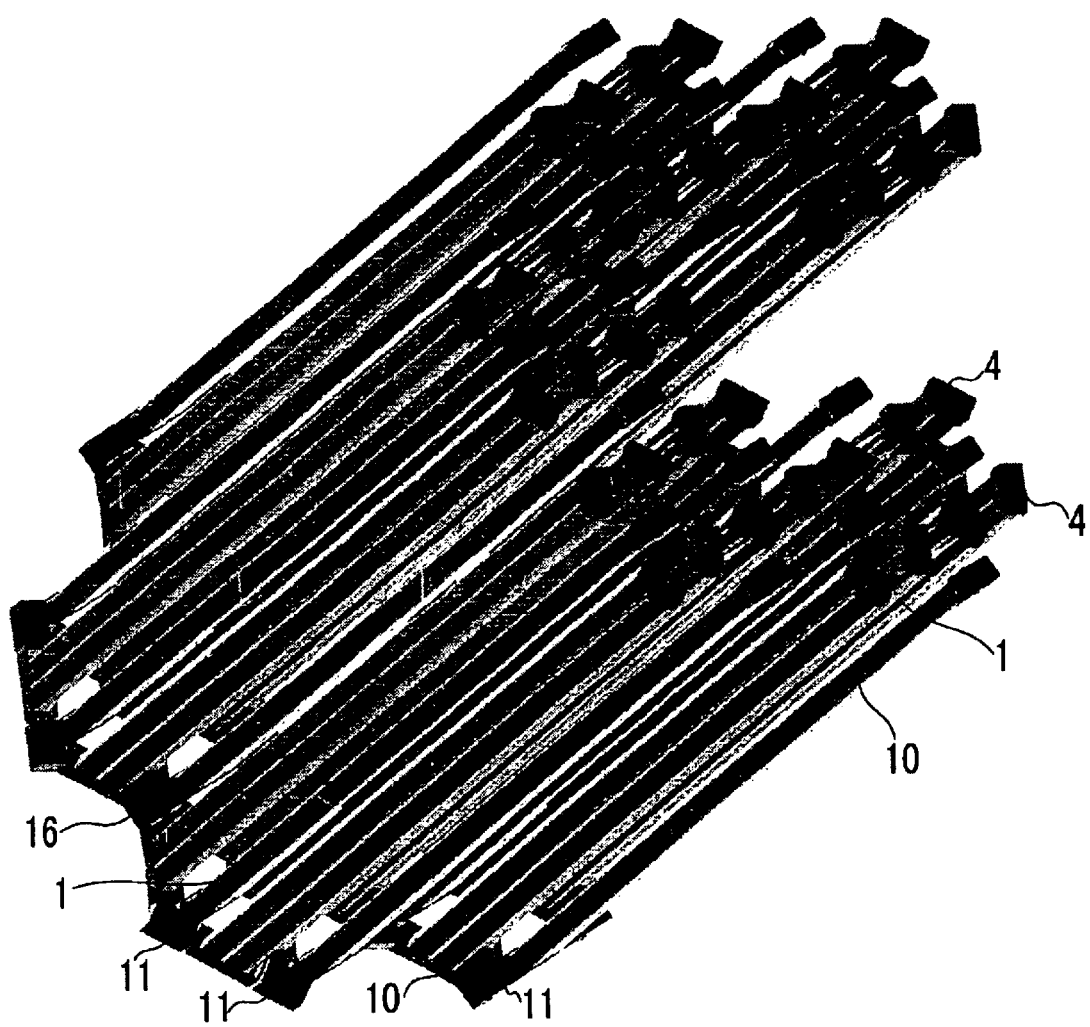
FIG. 29 is a perspective view showing a folded state of the connected frame structure of FIG. 26 where it is folded by setting the connection angle of the connecting-angle adjustable joint to 180°.

In addition, FIG. 28 shows a folded state of the frame structure of this embodiment. This folded state is obtained by folding the post-midpoint joint and the central joint of each of the posts. In this connection, since connection angle adjustable joint 16 is used for connecting five frame structures contained as an element of this structure, each of the element structures extends in the direction perpendicular to the receiving part of the connecting angle adjustable joint.

Since connecting angle adjustable joint 16 in this embodiment can adjust the connecting angle arbitrarily, it can unfold the structure as central joint 8 or tip joint 11 can do, so that contained parts at the ends of the posts are contained in the same plane. When the structure is fully unfolded by setting connecting angle γ to 180°, five frame structures contained in the structure form a folded state such that they extend in parallel as shown FIG. 29. Thus, it becomes easier to contain the structure.

In this connection, by fixing connecting angle γ to constant, connecting angle adjustable joint can be used also as the central joint, tip joint or connecting joint. By using the same joint for all of these purposes, it becomes possible to reduce the number of the parts.

In the embodiment shown in FIGS. 26 to 28, connecting angle γ is 138.19°. The connected structure of this embodiment constitutes a part of a spherical or discal structure.

Figure 30:
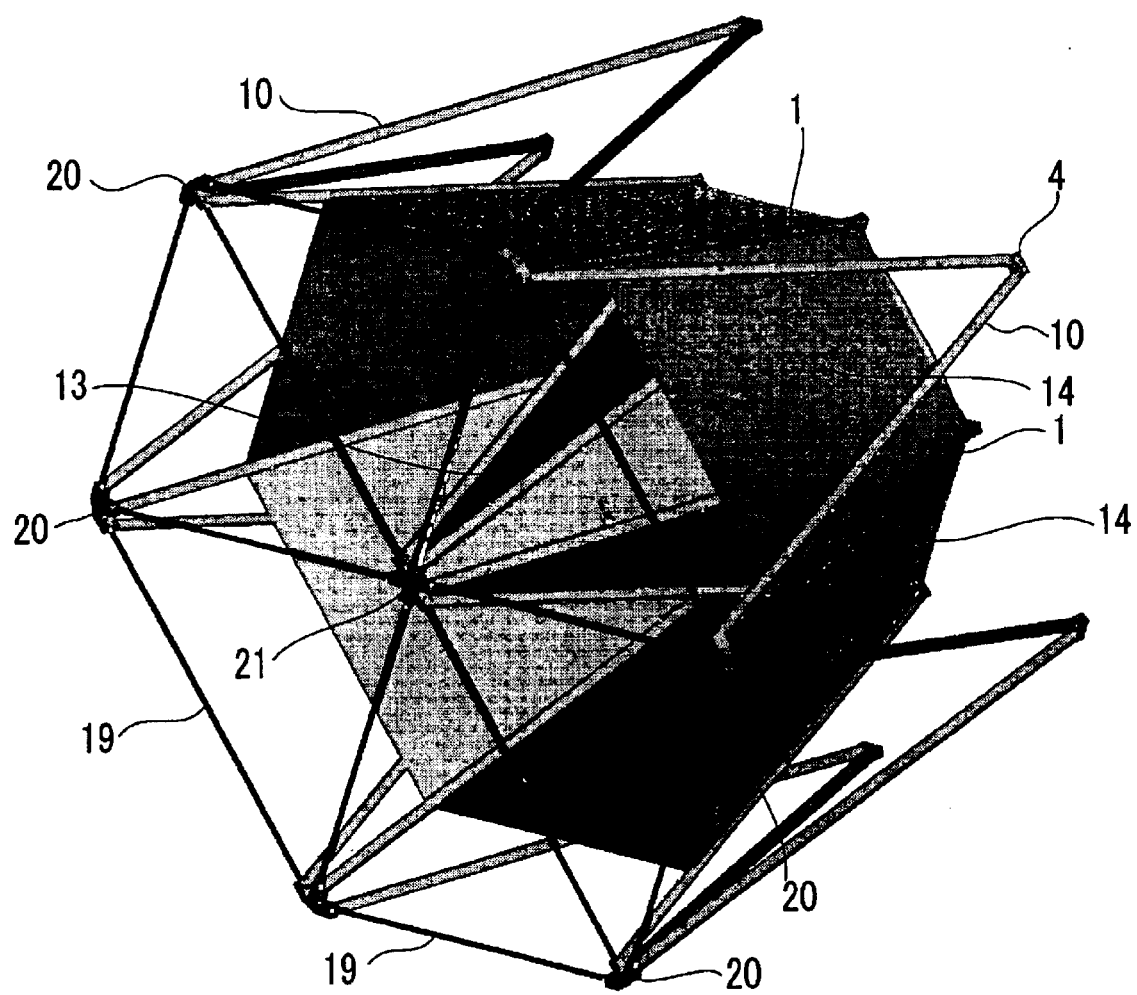
FIG. 30 is a perspective view showing an example of a folded state of the frame structure to which the membrane member is attached as shown in FIG. 10 a wire is extended between the tip joints and the central joint so that they have an adjusting mechanism which makes the length of the wire being adjustable.

Referring to FIG. 30, an embodiment which contains a mechanism for controlling the state of the frame structure shown in FIG. 10 arbitrarily to unfolded, flexed or folded state is shown.

In this structure, wire 19 is extended between tip joints 11 and between each of the tip joints and central joint 8 so that the distance between the joints can be adjusted by winding or unwinding the wire. Specifically, joints with controlling mechanism 20, 21 which have a mechanism for controlling the wound length of wire 19 and serve as tip joint and central joint are provided at each corresponding position. These joint have a driving mechanism for winding or unwinding the wire. By controlling the driving mechanism, the length of the wire between the joints is adjusted so that the distances between the tips of the posts are always identical to each other. Thus, the unfolded, flexed and folded states of the frame structure are freely controlled by simply adjusting the length of the wire. For a frame structure obtained by connecting a plurality of the frame structure shown in FIG. 30, the unfolded, flexed and folded states of such frame structure are arbitrarily controlled with ease by adjusting the length of the wire synchronously for all the frame structure containing the structural unit and the connecting posts. In addition, by adjusting the twelve wires extended between the joints shown in FIG. 30 to the same length, all the tips of the twelve posts are disposed in the same plane. A frame structure obtained by connecting a plurality of the frame structure shown in FIG. 30 can be driven and controlled as such by providing joints with controlling mechanism for controlling the wire as unit-connecting joints and connecting angle adjustable joints at each corresponding position.

According to the present invention, construction work on the orbit is no longer required. Thus, substantially automated construction for a large space structure can be achieved on the orbit.

According to another aspect of the present invention, since the frame structure of the present invention has a compact shape in its folded state, it is significantly easy to transport the frame structure to the aerospace. Specifically, since the structure of the present invention containing a six-pieces structural unit has an approximately circular hexagonal cross section in its folded state, it can be easily contained in a rocket fairing having circular cross section. Furthermore, since the structure obtained by connecting a plurality of the structural units has a shape of combined hexagons, it can also be easily contained in a rocket fairing.

The structure of the present invention will have a diameter of from 20 to 40 meters, which can be launched by a H-2 class rocket. The diameter of a connected fullerene structure obtained therefrom will 50 to 100 meters. As a result, such a structure can be transported by a single launch of a rocket, and a large space structure can be constructed by such single transportation procedure.

According to yet another aspect of the present invention, the controlling mechanism or driving mechanism for the structure is simplified by synchronizing the action of all the posts therein.

As described above, the structure of the present invention has a lot of advantages which cannot be achieved by the prior arts. The present invention enables to form a reflector for a large antenna in the aerospace by constituting the frame structure containing the structural units and membranous members properly.

In addition, the present invention enables to form a large solar battery panel by attaching a solar battery membrane thereto. Furthermore, the present invention enables to form a large spacecraft by mounting a bus equipment for a spacecraft on the structure of the present invention.

What is claimed is:

1. A frame structure having a structural unit containing six elongated posts, each post having first and second ends, said structural unit capable of having at least an unfolded state where the six posts are substantially contained in one plane and a folded state where the six posts extend substantially parallel to each other, the frame structure comprising:

post-midpoint joints formed in each of said posts for supporting said posts of said structural unit foldably at approximate midpoints of the posts;

a central joint for supporting said posts of said structural unit at the first ends of each of the posts rotatably in a plane perpendicular to the plane of the unfolded state;

said six posts of said structural unit being positioned in said unfolded state such that the posts extend radially from said central joint within substantially one plane, so that a line connecting the second ends of the six posts of the structural unit forms substantially an equilateral hexagon; and said six posts of said structural unit being bound at the first end by way of said central joint in said folded state, and being foldable such that the six posts extend parallel to each other by way of said central joint.

2. The frame structure according to claim 1, wherein each of said posts of said structural unit has a flexed state satisfying:

$$\beta = 2 \times (90° - \alpha)$$

where $\alpha$ is a connection angle between the post of the structural unit and said central joint at the first end, and $\beta$ is a flexion angle of the post in its flexed state at said post-midpoint joint between said unfolded state and said folded state, said frame structure further comprising:

elongated connecting posts being disposed in their flexed states such that they connect said second ends of adjoining posts of said structural unit to each other; and tip joints for connecting the second end of the post of the structural unit to a pair of ends of the connecting posts locating at both sides of the second end.

3. The frame structure according to claim 2, wherein the frame structure further comprising:

a first membrane member spread in a plane formed by adjoining first post parts which are the parts of the posts of said structural unit from said central joint to said post-midpoint joints;

a second membrane member spread in a plane formed by adjoining second post parts which are the parts of the posts of the structural unit from the post-midpoint joints to the second ends; and the first and the second membrane members, in the unfolded state, forming a membranous structure of equilateral hexagon whose center is the central joint in one plane, and in the folded state, being contained by cooperating with the posts and the connecting posts of the structural unit.

4. The frame structure according to claim 3, wherein the frame structure comprising a plurality of said structural unit, and the frame structure further comprising:

unit-connecting joints for rotatably supporting each second end of the posts of adjoining structural units and each one end of a pair of said connecting posts, or each second end of the posts of three neighboring structural units and each one end of three connecting posts accompanying with the structural units; and the unit-connecting joints connecting a plurality of said structural unit.

5. The frame structure according to claim 4, wherein the frame structure further comprising:

a connecting member for connecting said tip joints and said unit-connecting joint; and means for adjusting a connection angle or a flexion angle of the structural unit and the connecting post to a predetermined angle by controlling said connecting member to adjust a distance between the tip joint and the unit-connecting joint.

6. The frame structure according to claim 5, wherein said distance between the tip joint and the unit-connecting joint is adjusted within one plane.

7. The frame structure according to claim 1, wherein the frame structure further comprising:

a connecting member for connecting said tip joints and said central joint; and angle adjusting means for adjusting a flexion angle of the structural unit and the connecting post to a predetermined angle by controlling said connecting member to adjust a distance between the tip joint and the central joint.

8. The frame structure according to claim 7, wherein said distance between the tip joint and the central joint is adjusted within one plane.

* * * * *